(12) United States Patent
Bialas et al.

(10) Patent No.: US 12,480,130 B2
(45) Date of Patent: Nov. 25, 2025

(54) APTAMER AGAINST IRINOTECAN

(71) Applicant: APTAMER DIAGNOSTICS LIMITED, York (GB)

(72) Inventors: Katarzyna Bialas, York (GB); Christine Reinemann, York (GB); Edward Barnes, York (GB); David Bunka, York (GB); Arron Tolley, York (GB)

(73) Assignee: APTAMER DIAGNOSTICS LIMITED, North Yorkshire (GB)

( * ) Notice: Subject to any disclaimer, the term of this patent is extended or adjusted under 35 U.S.C. 154(b) by 1161 days.

(21) Appl. No.: 17/415,998

(22) PCT Filed: Nov. 27, 2019

(86) PCT No.: PCT/GB2019/053355
§ 371 (c)(1),
(2) Date: Jun. 18, 2021

(87) PCT Pub. No.: WO2020/128421
PCT Pub. Date: Jun. 25, 2020

(65) Prior Publication Data
US 2022/0049258 A1 Feb. 17, 2022

(30) Foreign Application Priority Data
Dec. 18, 2018 (GB) .................................. 1820631

(51) Int. Cl.
C12N 15/115 (2010.01)
A61K 31/4745 (2006.01)
G01N 33/94 (2006.01)

(52) U.S. Cl.
CPC ........ *C12N 15/115* (2013.01); *A61K 31/4745* (2013.01); *G01N 33/94* (2013.01); *C12N 2310/16* (2013.01); *C12N 2320/10* (2013.01); *G01N 2800/52* (2013.01)

(58) Field of Classification Search
CPC .............. C12N 15/115; C12N 2310/16; C12N 2320/10; C12N 2320/13; A61K 31/4745; G01N 33/94; G01N 2800/52
See application file for complete search history.

(56) References Cited

U.S. PATENT DOCUMENTS

2011/0136253 A1 6/2011 Salamone et al.

FOREIGN PATENT DOCUMENTS

WO WO 2011/071672 6/2011
WO WO 2017/173247 10/2017

OTHER PUBLICATIONS

Liu YQ, Li WQ, Morris-Natschke SL, Qian K, Yang L, Zhu GX, Wu XB, Chen AL, Zhang SY, Nan X, Lee KH. Perspectives on biologically active camptothecin derivatives. Med Res Rev. Jul. 2015;35(4):753-89. doi: 10.1002/med.21342. Epub Mar. 21, 2015. PMID: 25808858; PMCID: PMC4465867. (Year: 2015).*
NCBI GenBank: LR031874.1. *Brassica oleracea* HDEM genome, scaffold: C2. Positions 42244999 to 42245025. Published Nov. 16, 2018. (Year: 2018).*
De Man et al. "Individualization of Irinotecan Treatment: A Review of Pharmacokinetics, Pharmacodynamics, and Pharmacogenetics," Clinical Pharmacokinetics, 2018, vol. 57, pp. 1229-1254.
Stoltenburg et al. "Capture-SELEX: Selection of DNA Aptamers for Aminoglycoside Antibiotics," Journal of Analytical Methods in Chemistry, Dec. 2012, vol. 2012, Article 415697, 15 pages.
International Preliminary Report on Patentability for International (PCT) Patent Application No. PCT/GB2019/053355, dated Jun. 16, 2021, 9 pages.
Chen et al. "Quantification of irinotecan, SN38, and SN38G in human and porcine plasma by ultra high-performance liquid chromatography-tandem mass spectrometry and its application to hepatic chemoembolization," Journal of Pharmaceutical and Biomedical Analysis, 2012, vol. 62, pp. 140-148.
Fujita et al. "Structural and Affinity Analyses of G-Quadruplex DNA Aptamers for Camptothecin Derivatives," Pharmaceuticals, 2013, vol. 6, No. 9, pp. 1082-1093.
Guida et al. "Peptide biosensors for anticancer drugs: Design in silico to work in denaturizing environment," Biosensors and Bioelectronics, 2017, vol. 100, pp. 298-303.
Idili et al. "Seconds-resolved pharmacokinetic measurements of the chemotherapeutic irinotecan in situ in the living body," Chemical Science, Jul. 2019, vol. 10, No. 35, pp. 8164-8170.
Ruscito et al. "Small-Molecule Binding Aptamers: Selection Strategies, Characterization, and Applications," Frontiers in Chemistry, May 2016, vol. 4, No. 14, pp. 1-14.
Saita et al. "Development of ELISAs for Irinotecan and Its Active Metabolite SN-38," Biological and Pharmaceutical Bulletin, Aug. 2000, vol. 23, No. 8, pp. 911-916.
Spiga et al. "More DNA-Aptamers for Small Drugs: A Capture-SELEX Coupled with Surface Plasmon Resonance and High-Throughput Sequencing," ACS Combinatorial Science, Apr. 2015, vol. 17, No. 5, pp. 326-333.
Official Action for United Kingdom Patent Application No. GB1820631.8, dated May 10, 2019, 3 pages.
International Search Report and Written Opinion for International (PCT) Patent Application No. PCT/GB2019/053355, dated Mar. 2, 2020, 17 pages.

* cited by examiner

*Primary Examiner* — Brian Whiteman
*Assistant Examiner* — Amanda M Zahorik
(74) *Attorney, Agent, or Firm* — Sheridan Ross P.C.

(57) ABSTRACT

The present invention relates inter alia to aptamers that specifically bind to Irinotecan and methods of using the same.

21 Claims, 17 Drawing Sheets
Specification includes a Sequence Listing.

(a)

(b)

SEQUENCE LISTING

```
<160> NUMBER OF SEQ ID NOS: 17

<210> SEQ ID NO 1
<211> LENGTH: 10
<212> TYPE: DNA
<213> ORGANISM: Artificial Sequence
<220> FEATURE:
<223> OTHER INFORMATION: first randomised region (R1) of Aptamer CP13

<400> SEQUENCE: 1
gagaggattt                                                          10

<210> SEQ ID NO 2
<211> LENGTH: 40
<212> TYPE: DNA
<213> ORGANISM: Artificial Sequence
<220> FEATURE:
<223> OTHER INFORMATION: second randomised region (R2) of Aptamer CP13

<400> SEQUENCE: 2
cgctgtaagg ctcgggtatg agagtgtgga ggccagaggc                         40

<210> SEQ ID NO 3
<211> LENGTH: 47
<212> TYPE: DNA
<213> ORGANISM: Artificial Sequence
<220> FEATURE:
<223> OTHER INFORMATION: best performing minimal effective nucleic acid
      fragment (F4c) of Aptamer CP13

<400> SEQUENCE: 3
tctccgagag gattttgagg ctcgatccgc tgtaaggctc gggtatg                 47

<210> SEQ ID NO 4
<211> LENGTH: 62
<212> TYPE: DNA
<213> ORGANISM: Artificial Sequence
<220> FEATURE:
<223> OTHER INFORMATION: nucleic acid fragment (F4) of Aptamer CP13 with
      improved binding to Irinotecan as compared to full length CP13

<400> SEQUENCE: 4
agtccacgct cttttctcc gagaggattt tgaggctcga tccgctgtaa ggctcgggta    60
tg                                                                  62

<210> SEQ ID NO 5
<211> LENGTH: 57
```

```
<212> TYPE: DNA
<213> ORGANISM: Artificial Sequence
<220> FEATURE:
<223> OTHER INFORMATION: nucleic acid fragment (F4e) of Aptamer CP13
      with improved binding to Irinotecan as compared to full length
      CP13

<400> SEQUENCE: 5
acgctctttt tctccgagag gattttgagg ctcgatccgc tgtaaggctc gggtatg        57

<210> SEQ ID NO 6
<211> LENGTH: 67
<212> TYPE: DNA
<213> ORGANISM: Artificial Sequence
<220> FEATURE:
<223> OTHER INFORMATION: nucleic acid fragment (F5) of Aptamer CP13 with
      improved binding to Irinotecan as compared to full length CP13

<400> SEQUENCE: 6
agtccacgct cttttctcc gagaggattt tgaggctcga tccgctgtaa ggctcgggta      60
tgagagt                                                               67

<210> SEQ ID NO 7
<211> LENGTH: 101
<212> TYPE: DNA
<213> ORGANISM: Artificial Sequence
<220> FEATURE:
<223> OTHER INFORMATION: full nucleic acid sequence of Aptamer CP13

<400> SEQUENCE: 7
agtccacgct cttttctcc gagaggattt tgaggctcga tccgctgtaa ggctcgggta      60
tgagagtgtg gaggccagag gcgcattgag ggtgacatag g                        101

<210> SEQ ID NO 8
<211> LENGTH: 11
<212> TYPE: DNA
<213> ORGANISM: Artificial Sequence
<220> FEATURE:
<223> OTHER INFORMATION: first randomised region (R1) of Aptamer CP11

<400> SEQUENCE: 8
tggtctttag a                                                          11

<210> SEQ ID NO 9
<211> LENGTH: 40
<212> TYPE: DNA
<213> ORGANISM: Artificial Sequence
<220> FEATURE:
<223> OTHER INFORMATION: second randomised region (R2) of Aptamer CP11

<400> SEQUENCE: 9
cgctgtaagg ctcgggtatg agagtgtgga ggccagaggc                           40

<210> SEQ ID NO 10
<211> LENGTH: 52
<212> TYPE: DNA
<213> ORGANISM: Artificial Sequence
<220> FEATURE:
<223> OTHER INFORMATION: best performing minimal effective nucleic acid
      fragment (F3e) of Aptamer CP11

<400> SEQUENCE: 10
cgctcttttt ctcctggtct ttagatgagg ctcgatcaat cctaaagagg ac             52

<210> SEQ ID NO 11
```

-continued

```
<211> LENGTH: 57
<212> TYPE: DNA
<213> ORGANISM: Artificial Sequence
<220> FEATURE:
<223> OTHER INFORMATION: nucleic acid fragment (F3) of Aptamer CP11 with
      improved binding to Irinotecan as compared to full length CP11

<400> SEQUENCE: 11
atccacgctc tttttctcct ggtctttaga tgaggctcga tcaatcctaa agaggac        57

<210> SEQ ID NO 12
<211> LENGTH: 100
<212> TYPE: DNA
<213> ORGANISM: Artificial Sequence
<220> FEATURE:
<223> OTHER INFORMATION: full nucleic acid sequence of Aptamer CP11

<400> SEQUENCE: 12
atccacgctc tttttctcct ggtctttaga tgaggctcga tcaatcctaa agaggactag     60
atccgccagg gtaaaaggtg tgcattgagg gtgacatagg                          100

<210> SEQ ID NO 13
<211> LENGTH: 12
<212> TYPE: DNA
<213> ORGANISM: Artificial Sequence
<220> FEATURE:
<223> OTHER INFORMATION: exemplary immobilisation region (I)

<400> SEQUENCE: 13
tgaggctcga tc                                                         12

<210> SEQ ID NO 14
<211> LENGTH: 19
<212> TYPE: DNA
<213> ORGANISM: Artificial Sequence
<220> FEATURE:
<223> OTHER INFORMATION: exemplary first primer region (P1)

<400> SEQUENCE: 14
atccacgctc tttttctcc                                                  19

<210> SEQ ID NO 15
<211> LENGTH: 19
<212> TYPE: DNA
<213> ORGANISM: Artificial Sequence
<220> FEATURE:
<223> OTHER INFORMATION: exemplary second primer region (P2)

<400> SEQUENCE: 15
gcattgaggg tgacatagg                                                  19

<210> SEQ ID NO 16
<211> LENGTH: 12
<212> TYPE: DNA
<213> ORGANISM: Artificial Sequence
<220> FEATURE:
<223> OTHER INFORMATION: exemplary immobilisation sequence

<400> SEQUENCE: 16
gatcgagcct ca                                                         12

<210> SEQ ID NO 17
<211> LENGTH: 19
<212> TYPE: DNA
<213> ORGANISM: Artificial Sequence
<220> FEATURE:
```

```
<223> OTHER INFORMATION: reverse second primer region (P2)

<400> SEQUENCE: 17
cctatgtcac cctcaatgc                                                    19
```

US 12,480,130 B2

APTAMER AGAINST IRINOTECAN

CROSS REFERENCE TO RELATED APPLICATIONS

This application is a national stage application under 35 U.S.C. 371 and claims the benefit of PCT Application No. PCT/GB2019/053355 having an international filing date of 27 Nov. 2019, which designated the United States, and which PCT application claimed the benefit of Great Britain Patent Application No. 1820631.8 filed 18 Dec. 2018, the contents of each of which are incorporated herein by reference in their entireties.

REFERENCE TO SEQUENCE LISTING

This application contains a Sequence Listing submitted as an electronic text file named "P0314280WO_Sequence_listing_ST25.txt", having a size in bytes of 5,000 bytes, and created on Nov. 27, 2019. The information contained in this electronic file is hereby incorporated by reference in its entirety pursuant to 37 CFR § 1.52(e)(5).

FIELD OF THE INVENTION

Embodiments of the present invention relate to aptamers that specifically bind to Irinotecan and methods of using the same. For example, certain embodiments of the invention relate to methods of detecting the presence, absence or amount of Irinotecan in a sample using the aptamers described herein. Certain embodiments of the invention relate to methods of monitoring samples obtained from subjects undergoing Irinotecan therapy using the aptamers described herein.

BACKGROUND TO THE INVENTION

Irinotecan (7-ethyl-10-[4-(1-piperidino)-1-piperidino]carbonyloxycamptothecin, CPT-11) is a synthetically designed analogue of camptothecin that inhibits DNA topoisomerase I. Irinotecan is a prodrug. Irinotecan is converted to a biologically active metabolite 7-ethly-10-hydroxy-camptothecin (SN-38) by a carboxylesterase-converting enzyme. SN-38 inhibits topoisomerase I activity, resulting in inhibition of DNA replication and transcription. Irinotecan is used to treat cancer, especially colon, pancreatic and lung cancer. For example, Irinotecan is used as a first line therapy in the treatment of metastatic colorectal cancer (e.g. when administered with 5-fluorouracil and leucovorin). Irinotecan may also be used in combination with cisplatin for the treatment of extensive small cell lung cancer.

Irinotecan therapy is characterised by dose-limiting toxicities and large inter-individual pharmacokinetic variability. For example, Irinotecan can lead to side effects such as severe diarrhoea and extreme suppression of the immune system. Monitoring of the therapeutic levels of the drug (and adjusting to the required target levels) would be of value in minimizing toxicity and maximising the likelihood of tumour response in subjects.

Irinotecan is a low-molecular weight drug ($C_{33}H_{38}N_4O_6$, molar mass 586.678 Da) hindering efforts to develop immune assays against this target. For example, small molecules make very poor targets for many affinity reagents. Typically, small molecules feature a very low number of functional groups and therefore affinity reagents struggle to bind specifically to such substrates. Moreover, small molecules may have toxicity issues and/or lack of immunogenicity.

Despite these issues, there remains a need to develop agents which are simpler and easier to adapt to assay platforms, are more reliable to produce, do not rely on a pair of affinity ligands and give a gain-of-signal readout; whilst being capable of specifically binding to Irinotecan and its pharmacologically active salts without any cross-reactivity with closely related compounds or drug metabolites. For example, there remains a need to develop agents capable of specifically binding to Irinotecan and its pharmacologically active salts without any cross-reactivity to its biologically active metabolite SN-38. There remains a need to develop agents capable of quantifying Irinotecan and/or SN-38 in samples obtained from patients undergoing Irinotecan therapy.

Irinotecan levels in the serum of cancer subjects have been evaluated using chromatographic techniques such as HPLC with or without mass spectrometry (Chen, X. et al, J Pharm Biomed Anal. 2012 Mar. 25; 62: 140-148). However, such techniques are costly, time-consuming and require specialise laboratories, expensive equipment, heavy use of biological material, solvents and other materials.

In the case of irinotecan, antibody based tests have been developed, but these all have the same limitations associated with small molecule targeting immunoassays; they rely on a pair of antibodies (which can be difficult to isolate and expensive to produce) and/or rely on a competitive assay format which uses a 'loss-of-signal' output. Competitive assays of this nature are known to be prone to high background signals and a lack of sensitivity. With these limitations of traditional immunoassays; an alternative assay format is required.

It is an aim of some embodiments of the present invention to at least partially mitigate some of the problems identified in the prior art by developing detection agents which are faster, more reliable to produce and give a gain-of-signal readout as compared to antibody-based tests.

SUMMARY OF CERTAIN EMBODIMENTS OF THE INVENTION

The present invention relates to the development of Irinotecan binding aptamers and methods of using the same. The aptamers described herein are shown to work effectively and provide a simple means of testing the presence, absence or amount of Irinotecan in a sample using a simple gain-of-signal assay format. In particular, the aptamers described herein are capable of binding to Irinotecan with high affinity. Advantageously, the aptamers described herein allow clinical ranges of active Irinotecan (e.g. between about 10 ng/ml to about 10,000 ng/ml) and/or SN-38 (e.g. between about 0.1 ng/ml to about 100 ng/ml) to be detected in biological fluids.

Accordingly, certain aspects of the present invention provide inter alia:

An aptamer capable of specifically binding to Irinotecan, wherein the aptamer comprises or consists of:
  (a) a nucleic acid sequence selected from any one of SEQ ID NOs: 3 to 7 or 10 to 12;
  (b) a nucleic acid sequence having at least 85% identity with any one of SEQ ID NOs: 3 to 7 or 10 to 12;
  (c) a nucleic acid sequence having at least about 30 consecutive nucleotides of any one of SEQ ID NOs: 3 to 7 or 10 to 12; or (d) a nucleic acid sequence having at least about 30 consecutive nucleotides of a sequence having at least 85% identity with any one of SEQ ID NOs: 3 to 7 or 10 to 12;

An aptamer that competes for binding to Irinotecan with any aptamer as described herein;

A complex comprising any aptamer as described herein and a detectable molecule;

A biosensor or test strip comprising any aptamer as described herein;

Apparatus for detecting the presence, absence or level of Irinotecan in a sample, the apparatus comprising:
(i) a support; and
(ii) any aptamer as described herein;

Use of any aptamer, complex, biosensor or test strip as described herein for detecting, enriching, separating and/or isolating Irinotecan.

A method of detecting the presence, absence or amount of Irinotecan in a sample, the method comprising:
(i) interacting the sample with any aptamer as described herein; and
(ii) detecting the presence, absence or amount of Irinotecan;

A method of detecting the presence, absence or amount of SN-38 in a sample, the method comprising:
(a) interacting the sample with a first aptamer as described herein (e.g. CP13 aptamer) and detecting the amount of Irinotecan;
(b) interacting the sample with a second aptamer as described herein (e.g. CP11 aptamer) and detecting the amount of Irinotecan and SN-38; and
(c) comparing the amounts detected in (a) and (b) to determine the presence, absence or amount of SN-38 in the sample;

A method of treating or preventing cancer in a subject, the method comprising:
(i) administering an initial dose of Irinotecan to the subject;
(ii) detecting the amount of Irinotecan and/or SN-38 in a sample obtained from the subject according any method described herein; and
(iii) (a) if the level of Irinotecan and/or SN-38 is below a lower threshold level, administering an increased dose of Irinotecan to the subject;
(b) if the level of Irinotecan and/or SN-38 is above an upper threshold level, administering a decreased dose of Irinotecan to the subject.

A kit for detecting and/or quantifying Irinotecan, the kit comprising any aptamer as described herein.

DETAILED DESCRIPTION OF CERTAIN EMBODIMENTS OF THE INVENTION

Brief Description of the Figures

Certain embodiments of the present invention will be described in more detail below, with reference to the accompanying Figures in which.

The affinity of aptamer CP13 to (a) Irinotecan (in PBS6) was calculated with $2.7 \times 10^{-7}$ M±0.34 (270 nM±34). Affinity of aptamer CP13 to (b) SN-38 (in PBS6) was not detected. (Note: Steady State Kinetics have been fit to aptamer displacement assay data. As the responses are not association curves, this is not a true $K_D$ measurement and is intended for comparative purposes only.)

Figure 9:
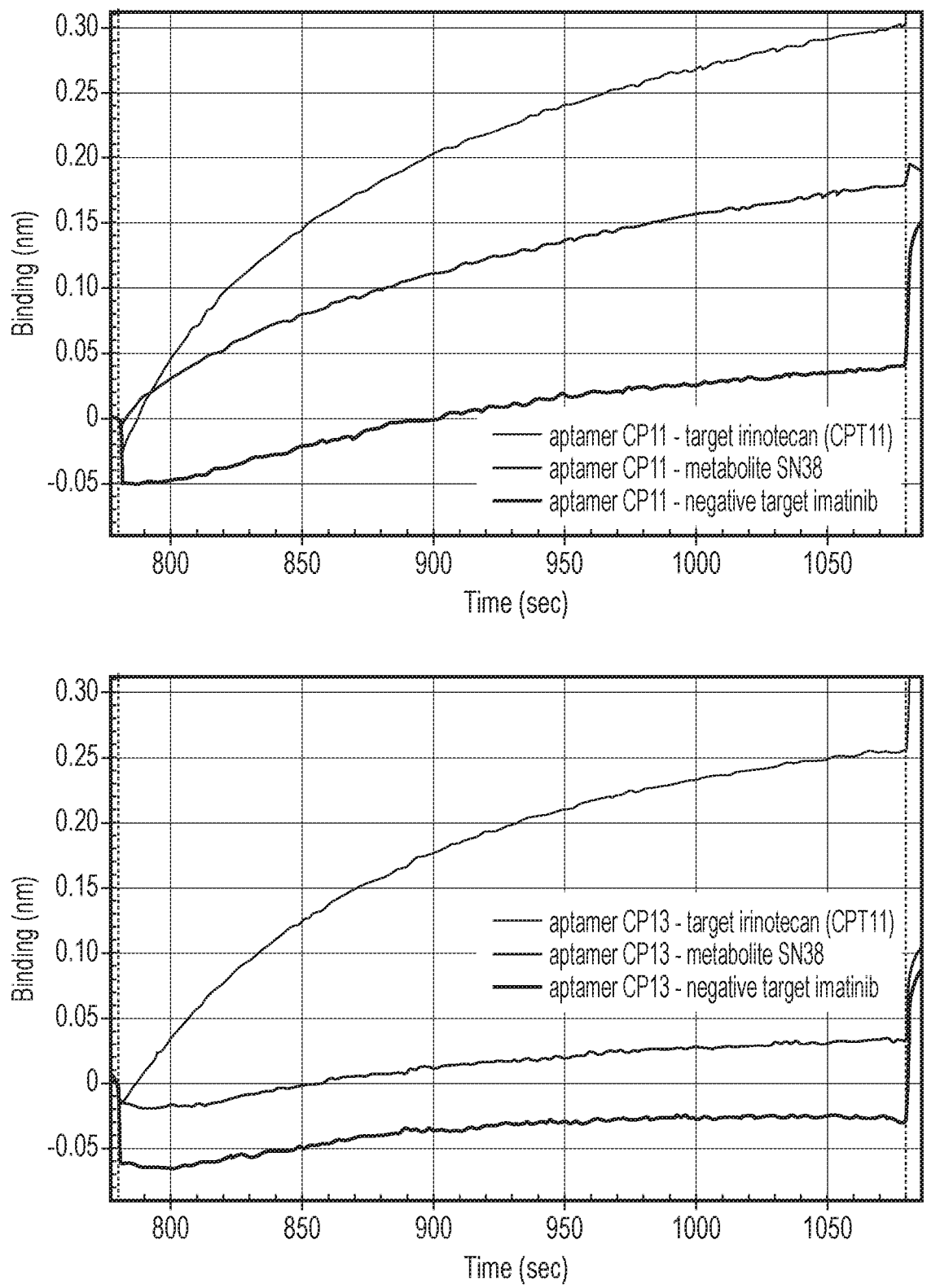

FIG. 9 shows comparative binding studies to determine aptamer specificity. BLI displacement assays confirmed high specificity of aptamer CP13 and moderate specificity of aptamer CP11. Aptamer CP11 showed increased binding to Irinotecan CPT-11. Lower but measurable signals were recorded for metabolite SN-38. Negative target Imatinib has very low level of binding. Aptamer CP13 showed increased binding to Irinotecan (CPT-11). No binding could be detected for metabolite SN-38 and for negative target Imatinib. Specificity studies were carried out using the BLI assay described in FIG. 3. Data shows only the 'dissociation by target binding' described in FIG. 3 and has been background subtracted and 'flipped' . . . .

Figure 10:
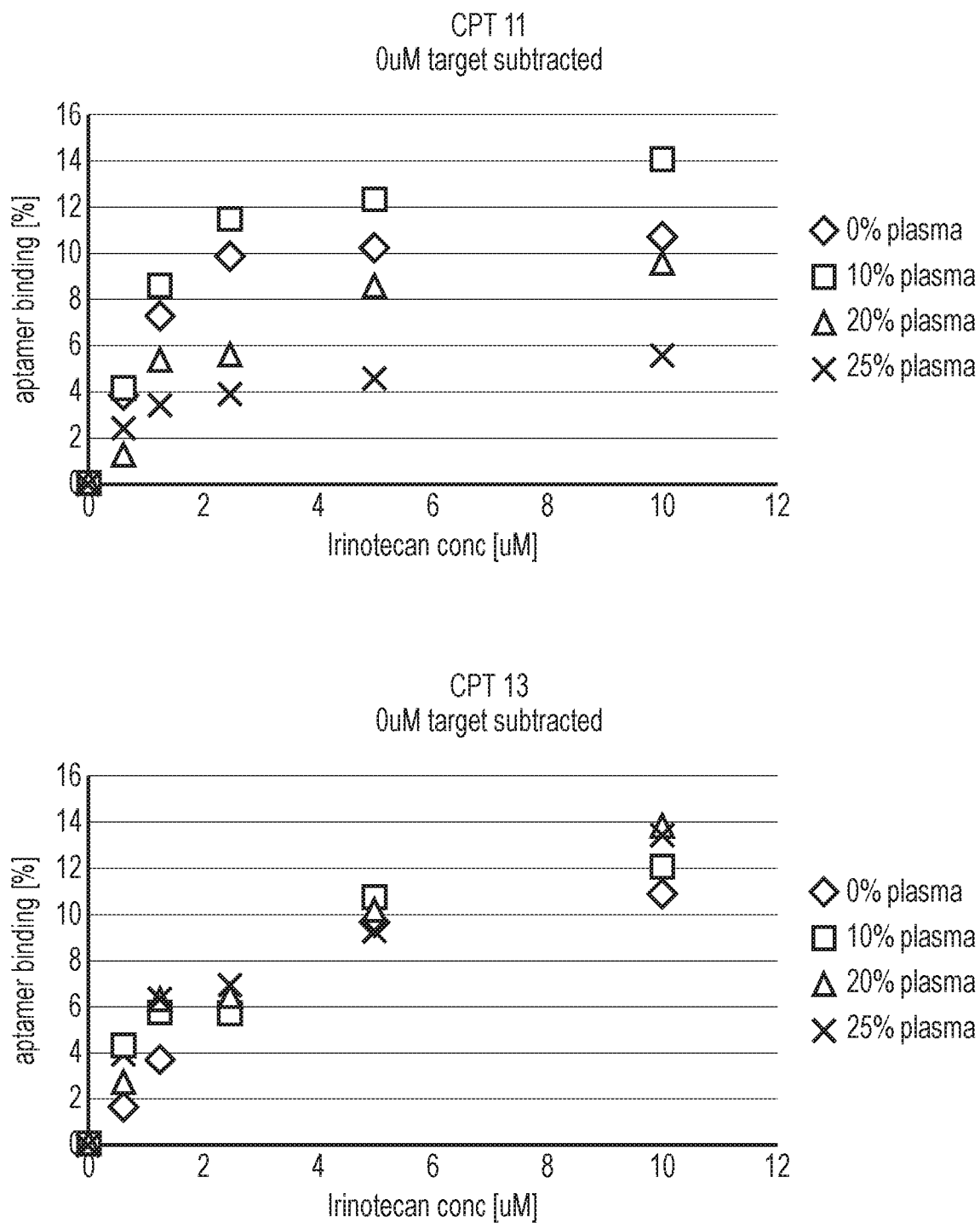

FIG. 10 shows the use of aptamers CP11 and CP13 in an ELISA-like assay format, binding to the target in buffered human plasma. Functionality of the aptamers have been demonstrated using microtiter plate-based aptamer displacement assay (fluorescence assay). Data shows the percentage of displaced (target-binding) aptamer, relative to aptamer input. The selected aptamers CP11 and CP13 show strong, concentration dependent binding to the target Irinotecan (leading to a gain-of-signal response) in the presence of different concentrations of human plasma. Assays were carried out at target concentrations that reflect the therapeutic range of Irinotecan.

Figure 11:
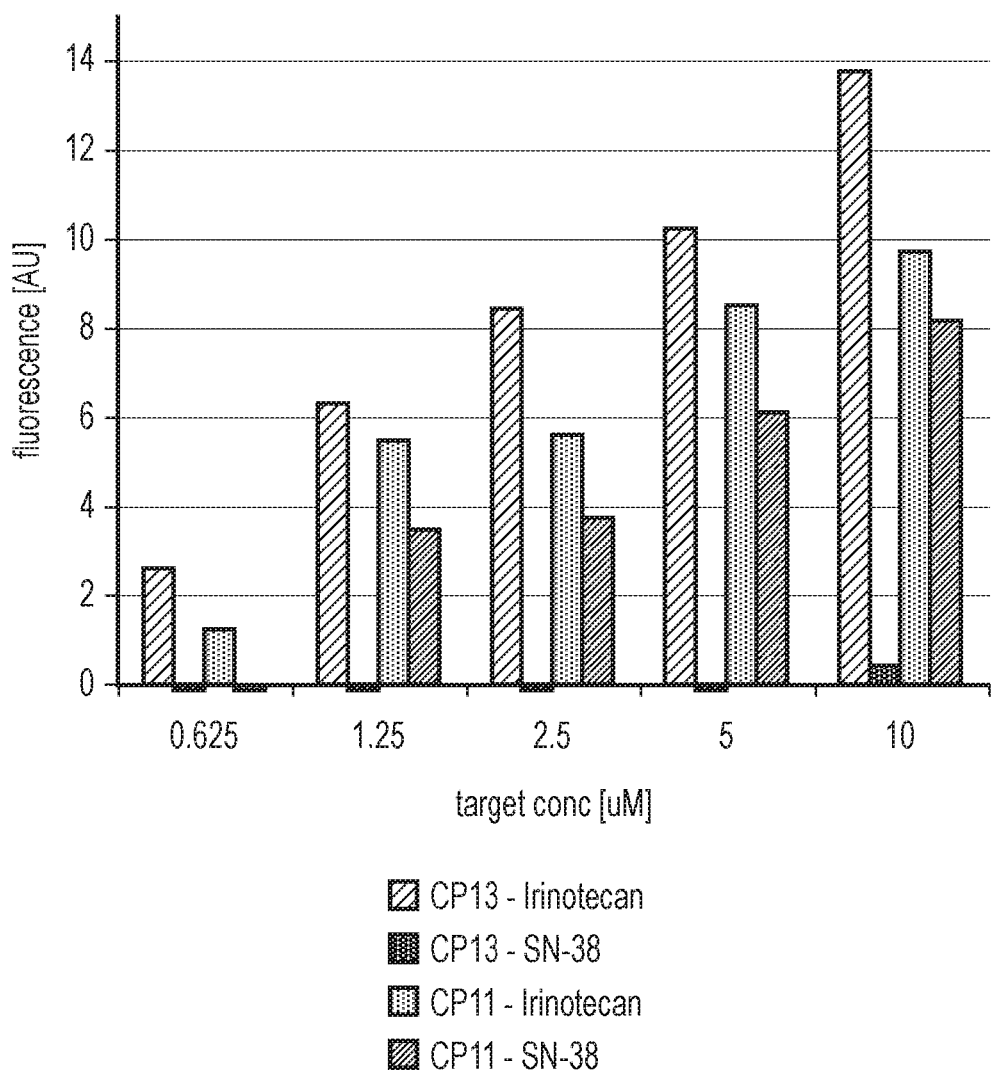

FIG. 11 shows aptamer specificity of aptamers CP11 and CP13, in buffered human plasma (20% plasma). The fluorescence response is plotted versus the target concentration, as tested with microtiter plate-based fluorescence displacement assay in an ELISA-like format. Results are plotted for aptamer CP13 binding to irinotecan and SN-38 and aptamer CP11 binding to irinotecan and SN-38.

Figure 12:
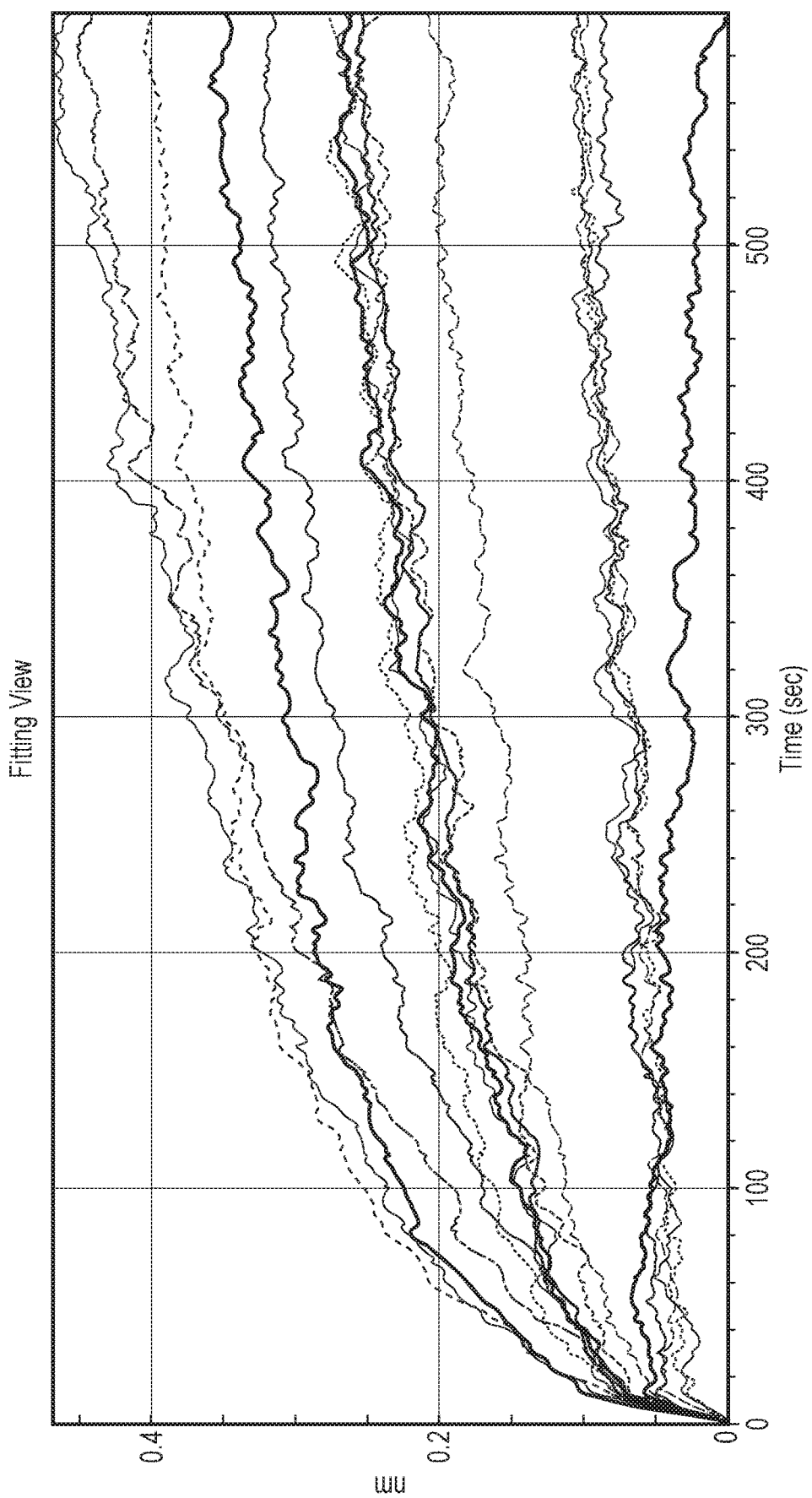

FIG. 12 shows BLI displacement assay binding studies used to identify the minimal effective nucleic acid fragments of aptamer CP13. A panel of truncated versions of aptamer CP13 was tested for their binding to target Irinotecan (10 µM in PBS6). The smallest and best performing fragment of aptamer CP13 is identified herein as SEQ ID NO: 3 (CP13-F4c, orange binding curve). Minimal Fragment Identification studies were carried out using the BLI based displacement assay described in FIG. 3. Data shows only the 'dissociation by target binding' described in FIG. 3 and has been background subtracted and 'flipped'

Figure 13:
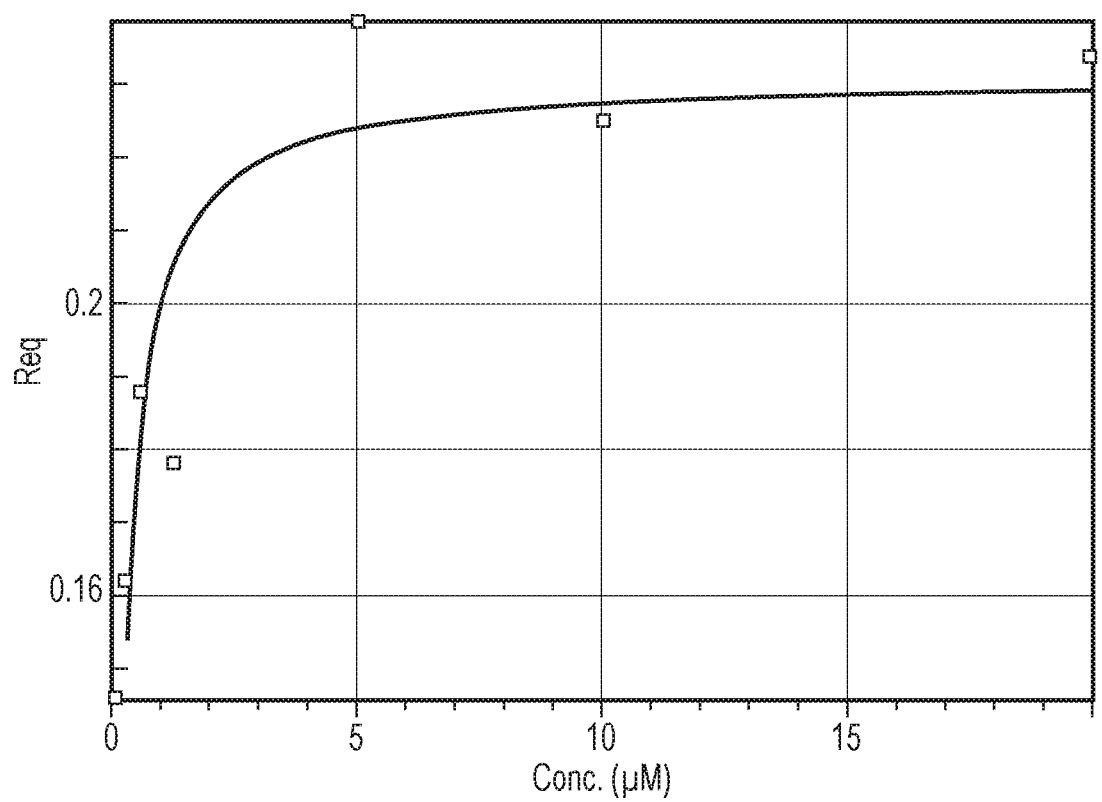

FIG. 13 shows aptamer fragment CP13-F4c binding to a concentration gradient of Irinotecan to determine the apparent aptamer affinity using Steady State Analysis. The aptamer fragment CP13-F4c showed target concentration dependent aptamer displacement. The signals (R equilibrium, Req) were 'flipped' and fitted using Steady State Analysis. The apparent affinity constant ($K_D$ value) was calculated using ForteBio Data Analysis 8.0 software. For comparative purposes, the affinity of CP13-F4c to Irinotecan (in PBS6) was calculated with $1.6 \times 10^{-7}$ M±0.4 (160 nM±40). (Note: Steady State Kinetics have been fit to aptamer displacement assay data. As the responses are not association curves, this is not a true $K_D$ measurement and is intended for comparative purposes only.)

Figure 14:
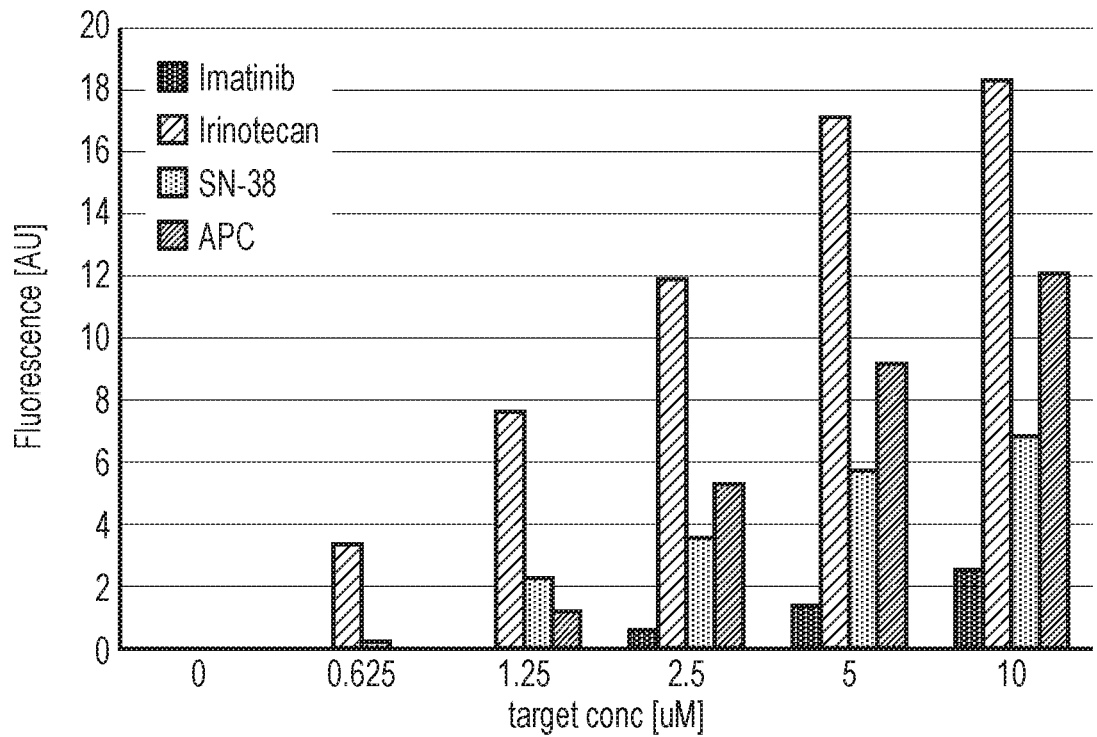

FIG. 14 shows binding studies to determine aptamer specificity. Target binding specificity of aptamer fragment CP13-F4c was tested using microtiter plate-based aptamer displacement assay (ELISA-like fluorescence assay). The minimal aptamer fragment shows strong concentration dependent binding to the target Irinotecan (CPT-11), leading to a gain-of-signal response. Irinotecan metabolites SN-38 and APC were also bound but to a lesser extent than Irinotecan. Assays were carried out in buffer PBS6, at target concentrations that reflect the therapeutic range of these drugs.

Figure 15:
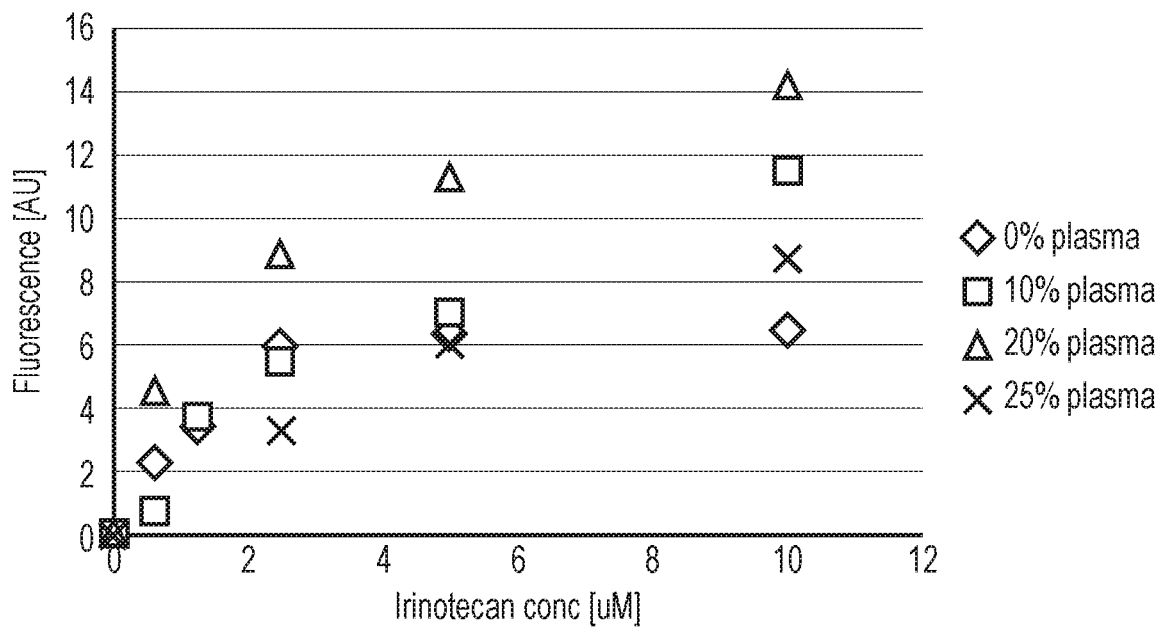

FIG. 15 shows target binding of aptamer fragment CP13-F4c in an ELISA-like assay format, binding to the target in buffered human plasma.. Functionality of the best performing aptamer fragment CP13-F4c was tested using microtiter plate-based aptamer displacement assay (ELISA-like fluorescence assay). The selected aptamer shows strong concentration dependent binding to its target Irinotecan (CPT-11) (leading to a gain-of-signal response) in the presence of different concentrations of human plasma. Assays were carried out at target concentrations that reflect the therapeutic range of this drug.

Figure 16:
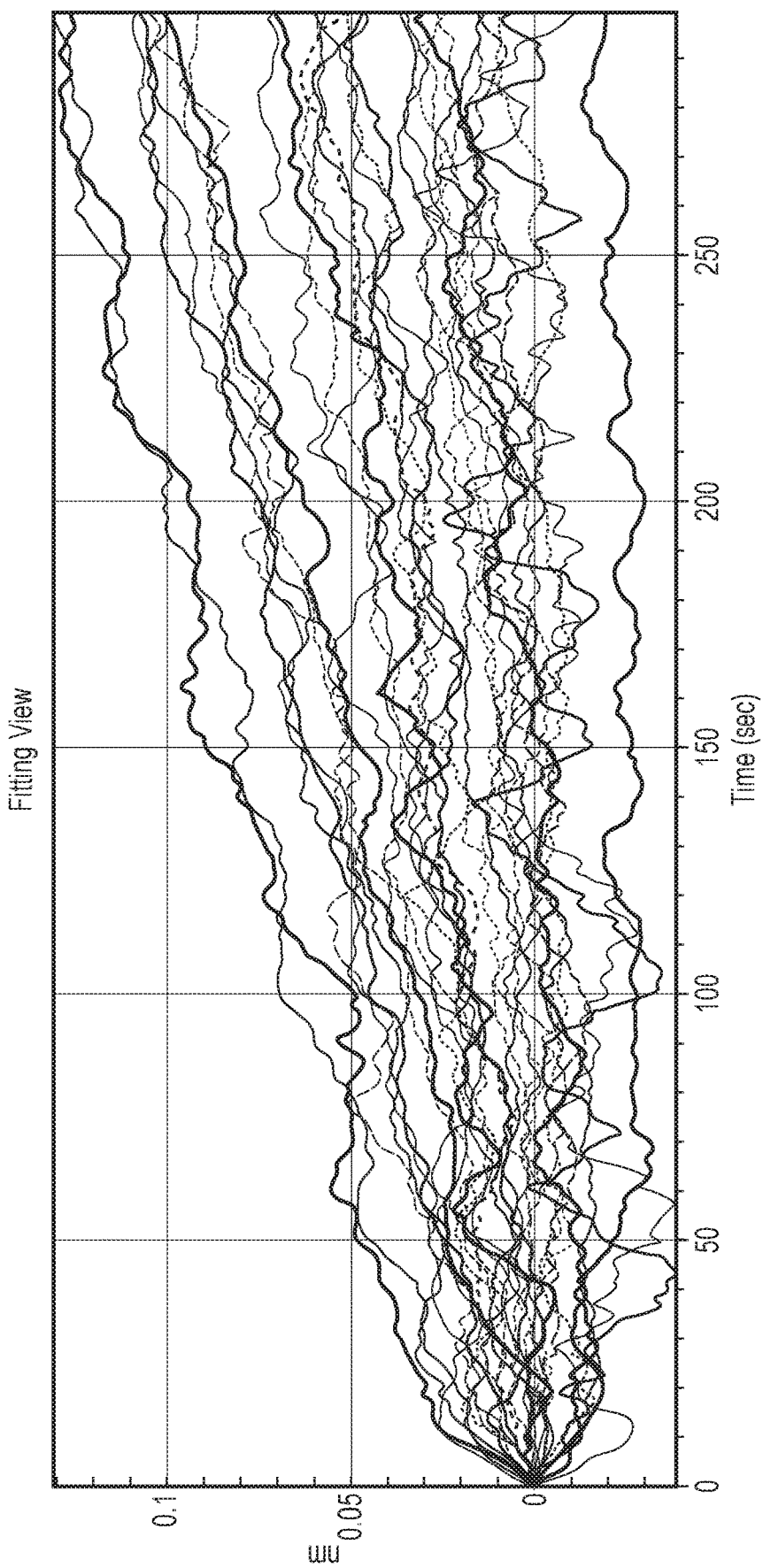

FIG. 16 shows BLI displacement assay binding studies used to identify the minimal effective fragments of Aptamer CP11. A panel of truncated versions of aptamer CP11 was tested for binding to target Irinotecan and to metabolite SN-38. The smallest and best performing fragment of Aptamer CP11 is identified herein as SEQ ID NO: 10 (CP11-F3e; red: Irinotecan binding curve, pink: SN-38 binding curve)

Minimal Fragment Identification studies were carried out using the BLI based displacement assay (flipped data, buffer subtracted).

SEQUENCE LISTING

SEQ ID NO: 1 shows a first randomised region (R1) of Aptamer CP13.

```
GAGAGGATTT
```

SEQ ID NO: 2 shows a second randomised region (R2) of Aptamer CP13.

```
CGCTGTAAGGCTCGGGTATGAGAGTGTGGAGGCCAGAGGC
```

SEQ ID NO: 3 shows the best performing minimal effective nucleic acid fragment (F4c) of Aptamer CP13.

```
TCTCCGAGAGGATTTTGAGGCTCGAT

CCGCTGTAAGGCTCGGGTATG
```

SEQ ID NO: 4 shows a nucleic acid fragment (F4) of Aptamer CP13 with improved binding to Irinotecan as compared to full length CP13.

```
AGTCCACGCTCTTTTTCTCCGAGAGGATTT

TGAGGCTCGATCCGCTGTAAGGCTCGGGTA

TG
```

SEQ ID NO: 5 shows a nucleic acid fragment (F4e) of Aptamer CP13 with improved binding to Irinotecan as compared to full length CP13.

ACGCTCTTTTTCTCCGAGAGGATTT*TGAGGCTCGAT*

*CCGCTGTAAGGCTCGGGTATG*

SEQ ID NO: 6 shows a nucleic acid fragment (F5) of Aptamer CP13 with improved binding to Irinotecan as compared to full length CP13.

AGTCCACGCTCTTTTTCTCCGAGAGGATTT

*TGAGGCTCGATCCGCTGTAAGGCTCGGGTA*

TGAGAGT

SEQ ID NO: 7 shows the full nucleic acid sequence of Aptamer CP13.

AGTCCACGCTCTTTTTCTCCGAGAGGATT

T*TGAGGCTCGATCCGCTGTAAGGCTCGGG*

TATGAGAGTGTGGAGGCCAGAGGCGCATT

GAGGGTGACATAGG

SEQ ID NO: 8 shows a first randomised region (R1) of Aptamer CP11.

TGGTCTTTAGA

SEQ ID NO: 9 shows a second randomised region (R2) of Aptamer CP11.

CGCTGTAAGGCTCGGGTATGAGAGTGTGGAGGCCAGAGGC

SEQ ID NO: 10 shows the best performing minimal effective nucleic acid fragment (F3e) of Aptamer CP11.

CGCTCTTTTTCTCCTGGTCTTTAGA*TGAGGCTCGAT*

CAATCCTAAAGAGGAC

SEQ ID NO: 11 shows a nucleic acid fragment (F3) of Aptamer CP11 with improved binding to Irinotecan as compared to full length CP11.

ATCCACGCTCTTTTTCTCCTGGTCTTTAG

A*TGAGGCTCGATCAATCCTAAAGAGGAC*

SEQ ID NO: 12 shows the full nucleic acid sequence of Aptamer CP11.

ATCCACGCTCTTTTTCTCCTGGTCTTTAGA

*TGAGGCTCGATCAATCCTAAAGAGGACTAG*

ATCCGCCAGGGTAAAAGGTGTGCATTGAGG

GTGACATAGG

SEQ ID NO: 13 shows an exemplary immobilisation region (I).

TGAGGCTCGATC

SEQ ID NO: 14 shows an exemplary first primer region (P1).

ATCCACGCTCTTTTTCTCC

SEQ ID NO: 15 shows an exemplary second primer region (P2).

GCATTGAGGGTGACATAGG

SEQ ID NO: 16 shows an exemplary immobilisation sequence.

GATCGAGCCTCA

SEQ ID NO: 17 shows an exemplary reverse second primer region (P2)

CCTATGTCACCCTCAATGC

As explained further below, any underlined sequence refers to first (P1) and second (P2) primer sites and any italic sequence refers to the immobilisation region of the aptamer (i.e., nucleic acid sequence of the aptamer capable of binding to at least a portion of immobilisation sequence). R1 and R2 refer to first and second randomised regions respectively.

DETAILED DESCRIPTION

Further features of certain embodiments of the present invention are described below. The practice of embodiments of the present invention will employ, unless otherwise indicated, conventional techniques of molecular biology, microbiology, recombinant DNA technology and immunology, which are within the skill of those working in the art.

Most general molecular biology, microbiology recombinant DNA technology and immunological techniques can be found in Sambrook et al, Molecular Cloning, A Laboratory manual (2001) Cold Harbor-Laboratory Press, Cold Spring Harbor, N.Y. or Ausubel et al., Current protocols in molecular biology (1990) John Wiley and Sons, N.Y. Unless defined otherwise, all technical and scientific terms used herein have the same meaning as commonly understood by one of ordinary skill in the art to which this disclosure belongs. For example, the Concise Dictionary of Biomedicine and Molecular Biology, Juo, Pei-Show, $2^{nd}$ ed., 2002, CRC Press; The Dictionary of Cell and Molecular Biology, 3rd ed., Academic Press; and the Oxford University Press, provide a person skilled in the art with a general dictionary of many of the terms used in this disclosure.

Units, prefixes and symbols are denoted in their Système International de Unitese (SI) accepted form. Numeric ranges are inclusive of the numbers defining the range. Unless otherwise indicated, amino acid sequences are written left to right in amino to carboxy orientation and nucleic acid sequences are written left to right in 5' to 3' orientation.

In the following, the invention will be explained in more detail by means of non-limiting examples of specific embodiments. In the example experiments, standard reagents and buffers free from contamination are used.

Irinotecan

The invention provides aptamers capable of specifically binding to Irinotecan.

Irinotecan has the following structure:

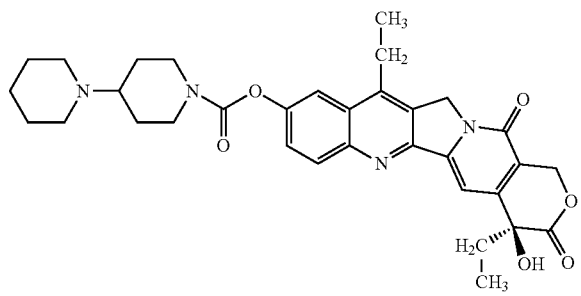 [SMILES: CCc1c2c(nc3ccc(OC(=O)N4CCC(N5CCCCC5)CC4)cc13)-c1cc3c(c(=O)n1C2)COC(=O)[C@]3(O)CC]

Irinotecan and its pharmaceutically acceptable salts (e.g. Irinotecan hydrochloride) are used to treat cancer. For example, Irinotecan demonstrates anticancer activity in many solid tumors and is currently widely used in the treatment of colorectal, pancreatic and lung cancer.

Irinotecan and its pharmaceutically acceptable salts are pro-drugs for administering the active SN-38 and its pharmaceutically acceptable salts. SN-38 has the structure:

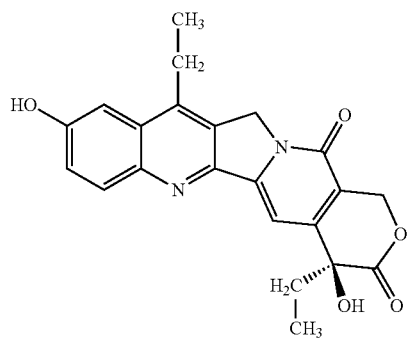 [SMILES: CCc1c2c(nc3ccc(O)cc13)-c1cc3c(c(=O)n1C2)COC(=O)[C@]3(O)CC]

SN-38 is 100- to 1000-fold more cytotoxic that Irinotecan. The metabolic conversion of Irinotecan to the active metabolite SN-38 is mediated by carboxylesterase enzymes and primarily occurs in the liver. SN-38 is subsequently conjugated predominantly by the enzyme UDP-glucuronosyl transferase 1A1 (UGT1A1) to form a glucuronide metabolite.

As used herein, the term "Irinotecan" is understood to include Irinotecan and/or any of its pharmacologically active salts including Irinotecan hydrochloride.

In certain embodiments, the aptamers of the invention bind specifically to Irinotecan and/or its pharmacologically active salts. In certain embodiments, the aptamers of the invention bind specifically to Irinotecan hydrochloride.

In certain embodiments, the aptamers of the invention bind specifically to Irinotecan and/or its pharmacologically active salts and do not bind or bind with only low affinity to SN-38.

In certain embodiments, the aptamers of the invention bind specifically to Irinotecan hydrochloride and do not bind or bind with only low affinity to SN-38.

In certain embodiments, the aptamers of the invention bind specifically to Irinotecan and/or its pharmacologically active salts and also bind specifically to SN-38.

In certain embodiments, the aptamers of the invention bind specifically to Irinotecan hydrochloride and also bind specifically to SN-38.

An aptamer which binds "specifically" to Irinotecan is an aptamer that binds with preferential or high affinity to Irinotecan and/or pharmacologically active salts but does not bind or binds with only low affinity to other functionally and structurally related small molecules (e.g. Imatinib). For example, the aptamer may bind to Irinotecan without substantial cross-reactivity to other functionally and structurally related small molecules (e.g. Imatinib).

In certain embodiments, an aptamer binds with preferential or high affinity if it binds with a binding dissociation equilibrium constant ($K_D$) of less than about 1 µM, less than about 500 nM, less than about 400 nM, less than about 300 nM, less than about 200 nM, less than about 100 nM, less than about 90 nM, less than about 80 nM, less than about 70 nM, less than about 60 nM, less than about 50 nM, less than about 40 nM, less than about 30 nM, less than about 20 nM, less than about 10 nM, less than about 1 nM or less. Binding affinity of aptamers may be measured by any method known to person skilled in the art, including, for example, surface plasmon resonance (SPR), biolayer interferometry (BLI), displacement assay and/or steady state analysis.

In certain embodiments, the aptamers of the invention bind specifically to Irinotecan and/or its pharmacologically active salts and do not bind or bind with only low affinity to SN-38. An aptamer which does not bind or binds with only low affinity may bind to Irinotecan and/or its pharmacologically active salts without substantial cross-reactivity to SN-38.

In certain embodiments, an aptamer binds with low affinity if it binds with a binding dissociation equilibrium constant ($K_D$) of more than about 1 µM, more than about 2 µM, more than about 3 µM, more than about 4 µM, more than about 5 µM, more than about 10 µM or more. Binding affinity of aptamers may be measured, for example, using the techniques described herein.

In certain embodiments, an aptamer (e.g. CP11 or fragments thereof) binds specifically to Irinotecan and SN-38. For example, the aptamer may bind to Irinotecan with a $K_D$ of less than about 1 µM, less than about 500 nM, less than about 400 nM, less than about 300 nM, less than about 200 nM, less than about 160 nM, less than about 100 nM, less than about 90 nM, less than about 80 nM, less than about 70 nM, less than about 60 nM, less than about 50 nM, less than about 40 nM, less than about 30 nM, less than about 20 nM, less than about 10 nM, less than about 1 nM or less. The aptamer may also bind to SN-38 with a $K_D$ of less than about 1 µM, less than about 500 nM, less than about 400 nM, less than about 300 nM, less than about 200 nM, less than about 100 nM, less than about 90 nM, less than about 80 nM, less than about 70 nM, less than about 60 nM, less than about 50 nM, less than about 40 nM, less than about 30 nM, less than about 20 nM, less than about 10 nM, less than about 1 nM or less. In such embodiments, the aptamer is cross-reactive for Irinotecan and SN-38.

In certain embodiments, an aptamer (e.g. CP13 or fragments thereof) binds specifically to Irinotecan and does not bind or bind with only low affinity to SN-38. For example, the aptamer may bind to Irinotecan with a $K_D$ of less than about 1 µM, less than about 500 nM, less than about 400 nM, less than about 300 nM, less than about 200 nM, less than about 160 nM, less than about 100 nM, less than about 90 nM, less than about 80 nM, less than about 70 nM, less than about 60 nM, less than about 50 nM, less than about 40 nM, less than about 30 nM, less than about 20 nM, less than about 10 nM, less than about 1 nM or less. The aptamer may not bind or bind to SN-38 with a $K_D$ of more than about 1 µM, more than about 2 µM, more than about 3 µM, more than about 4 µM, more than about 5 µM, more than about 10 µM or more. In such embodiments, the aptamer binds to Irinotecan without cross-reactivity to SN-38.

Aptamers

The aptamers described herein are small artificial affinity ligands, comprising DNA, RNA or modifications thereof capable of specifically binding to Irinotecan with high affinity and specificity.

As used herein, "aptamer", "nucleic acid molecule" or "oligonucleotide" are used interchangeably to refer to a non-naturally occurring nucleic acid molecule that has a desirable action on a target molecule (i.e., Irinotecan).

The aptamers of the invention may be DNA aptamers. For example, the aptamers may be formed from single-stranded DNA (ssDNA). Alternatively, the aptamers of the invention may be RNA aptamers. For example, the aptamers may be formed from single-stranded RNA (ssRNA). The aptamers of the invention may comprise modified nucleic acids as described herein.

In certain embodiments, the aptamers of the invention are prepared using principles of in vitro selection known in the art, that include iterative cycles of target binding, partitioning and preferential amplification of target binding sequences.

In certain embodiments, the aptamers are selected from a nucleic acid molecule library such as a single-stranded DNA or RNA nucleic acid molecule library. Typically, the aptamers are selected from a "universal aptamer selection library" that is designed such that any selected aptamers need little to no adaptation to convert into any of the listed assay formats. In certain embodiments, the "universal aptamer selection library" comprises the following functional parts: a first primer region, at least one immobilisation region, at least one randomised region and a second primer region.

In certain embodiments, the nucleotide sequences of the aptamer library have the following structure (in a 5' to 3' direction):

P1-R1-I-R2-P2, wherein P1 is the first primer region, R1 is the first randomised region, I is the immobilisation region, R2 is the further randomised region and P2 is the further primer region, wherein at least R1 and/or R2 or a portion thereof are involved in target molecule binding.

Once selected, the aptamer may be further modified before being used e.g. to remove one or both primer sequences and/or parts of the randomised or immobilisation region not required for target binding.

Typically, aptamers of the invention comprise an immobilisation region (i.e., docking sequence). The immobilisation region of the aptamer may hybridise over at least a portion of an "immobilisation oligonucleotide". Typically, the immobilisation region is complementary to at least a portion of an immobilisation oligonucleotide. Typically, the immobilisation region is between about 10 to about 20 nucleotides in length, e.g. 10, 11, 12, 13, 14, 15, 16, 17, 18, 19 or 20 nucleotides in length.

The terms "hybridises" and "hybridisation" as used herein mean to form an interaction based on Watson-crick base pairing between a fixed region within the aptamer library and a complimentary sequence within the 'immobilisation oligonucleotide', under conventional hybridisation conditions, preferably under stringent conditions, as described, for example, in Sambrook et al., Molecular Cloning, A Laboratory Manual, 3. Ed. (2001) Cold Spring Harbor Laboratory Press, Cold Spring Harbor, NY.

The skilled person would understand the immobilisation region of the aptamer may be selected, depending, for example, on the starting library and/or aptamer selection protocol. A variety of combinatorial random libraries are available via commercial sources. For example, the immobilisation region may comprise SEQ ID NO: 13 and/or the immobilisation oligonucleotide may comprise SEQ ID NO: 16.

Typically, aptamers of the invention comprise a first primer region (e.g. at the 5' end), a second primer region (e.g. at the 3' end), or both. The primer regions may serve as primer binding sites for PCR amplification of the library and selected aptamers.

The skilled person would understand different primer sequences can be selected depending, for example, on the starting library and/or aptamer selection protocol. For example, aptamers of the invention may comprise SEQ ID NOs: 14 and/or 15.

The first primer region and/or second region may comprise a detectable and/or targeting label as described herein. For example, the first and/or second primer region may be fluorescently (e.g. FAM)-labelled. In certain embodiments, the first and/or second primer region primer are phosphate ($PO_4$) labelled.

The aptamers of the invention may be selected from a nucleic acid molecule library having a first randomised region (R1) and/or second randomised region (R2). The aptamers of the invention may comprise at least a portion of R1 and/or R2. In certain embodiments, the aptamers of the invention comprise at least a portion (e.g., at least 8 nucleotides or more) of SEQ ID NO: 1 or 8 and/or at least a portion (e.g., at least 8 consecutive nucleotides or more) of SEQ ID NO: 2 or 9. In certain embodiments, the aptamers of the invention comprise SEQ ID NO: 1 or 8. In certain embodiments, the aptamers of the invention comprise at least 30 consecutive nucleotides or more of SEQ ID NO: 2 or 9.

In certain embodiments, the aptamers of the invention comprise or consist of a nucleic acid sequence selected from any one of SEQ ID NOs: 3 to 7 or 10 to 12 (e.g. relating to the "CP13" and/or "CP11" aptamers).

In certain embodiments, the aptamers of the invention comprise or consist of a nucleic acid sequence selected from any one of SEQ ID NOs: 3 to 7 (e.g. relating to the "CP13" aptamer). As described herein, the CP13 aptamer is capable of binding specifically to Irinotecan and does not bind or binds with only low affinity to SN-38.

In certain embodiments, the aptamers of the invention comprise or consist of a nucleic acid sequence selected from any one of SEQ ID NOs: 3 to 6. These sequences relate to CP13 fragments shown to have improved binding to Irinotecan as compared to full-length CP13. In certain embodiments, the aptamers of the invention comprise or consist of SEQ ID NO: 3. This minimal effective fragment is shown herein as the best performing aptamer against Irinotecan.

In certain embodiments, the aptamers of the invention comprise or consist of a nucleic acid sequence selected from any one of SEQ ID NOs: 10 to 12 (e.g. relating to the "CP11" aptamers). As described herein, the CP11 aptamer is capable of binding specifically to Irinotecan and SN-38.

In certain embodiments, the aptamers of the invention comprise or consist of a nucleic acid sequence selected from SEQ ID NOs: 10 or 11. These sequences relate to CP11 fragments shown to have improved binding to Irinotecan as compared to full-length CP11. In certain embodiments, the aptamers of the invention comprise or consist of SEQ ID NO: 10. This minimal effective fragment is shown herein as the best performing aptamer capable of binding specifically to Irinotecan and SN-38.

In certain embodiments, the aptamers of the invention comprise or consist of CP13 aptamers (e.g. any one of SEQ ID NOs: 3 to 7) and CP11 aptamers (e.g. any one of SEQ ID Nos: 10 to 12. The combination of these aptamers (e.g. "first" and "second" aptamers as described herein) may allow the presence, absence or level Irinotecan and/or SN-38 to be measured in a sample.

In certain embodiments, aptamers of the invention comprise or consist of a nucleic acid sequence having at least 85%, at least 90%, at least 95%, at least 96%, at least 97%, at least 98%, at least 99% or more sequence identity to the nucleotide sequence of any one of SEQ ID NOs: 3 to 7 or 10 to 12.

In certain embodiments, aptamers of the invention comprise or consist of a nucleic acid sequence having at least 85%, at least 90%, at least 95%, at least 96%, at least 97%, at least 98%, at least 99% or more sequence identity to the nucleotide sequence of any one of SEQ ID NOs: 3 to 6.

In certain embodiments, aptamers of the invention comprise or consist of a nucleic acid sequence having at least 85%, at least 90%, at least 95%, at least 96%, at least 97%, at least 98%, at least 99% or more sequence identity to the nucleotide sequence of SEQ ID NO: 3.

In certain embodiments, aptamers of the invention comprise or consist of a nucleic acid sequence having at least 85%, at least 90%, at least 95%, at least 96%, at least 97%, at least 98%, at least 99% or more sequence identity to the nucleotide sequence of any one of SEQ ID NO: 10 or 11.

In certain embodiments, aptamers of the invention comprise or consist of a nucleic acid sequence having at least 85%, at least 90%, at least 95%, at least 96%, at least 97%, at least 98%, at least 99% or more sequence identity to the nucleotide sequence of any one of SEQ ID NO: 10.

As used herein, "sequence identity" refers to the percentage of nucleotides in a candidate sequence that are identical with the nucleotides in said sequences after aligning the sequences and introducing gaps, if necessary, to achieve the maximum percent sequence identity. Alignment for purposes of determining percent nucleic acid sequence identity can be achieved in various ways that are within the skill in the art, for instance, using publicly available computer software such as BLAST, BLAST-2, ALIGN, CLUSTALW or Megalign (DNASTAR) software. For example, % nucleic acid sequence identity values can be generated using sequence comparison computer programs found on the European Bioinformatics Institute website.

In certain embodiments, aptamers of the invention comprise or consist of a minimal effective fragment of SEQ ID NO: 7 (full length CP13) or SEQ ID NO: 12 (full length CP11). Herein, a "minimal effective fragment" is understood to mean a minimal-sized fragment (e.g. portion) of the full-length aptamer (e.g. SEQ ID NO: 7 or 12) capable of binding to Irinotecan with the same, comparable or improved affinity as compared to the full-length aptamer. A minimal effective fragment may compete for binding to Irinotecan with the full-length aptamer (e.g. SEQ ID NO: 7 or 12).

In certain embodiments, aptamers of the invention comprise or consist of a nucleic acid sequence comprising at least about 30, 35, 40, 45 or more consecutive nucleotides (e.g. up to the total length) of a sequence having at least 85%, at least 90%, at least 95%, at least 96%, at least 97%, at least 98%, at least 99% or more identity with any one of SEQ ID NOs: 3 to 7 or 10 to 12. In this context the term "about" typically means the referenced nucleotide sequence length plus or minus 10% of that referenced length.

In certain embodiments, aptamers of the invention comprise or consist of a nucleic acid sequence comprising at least about 30, 35, 40, 45 or more consecutive nucleotides (e.g. up to the total length) of a sequence having at least 85%, at least 90%, at least 95%, at least 96%, at least 97%, at least 98%, at least 99% or more identity with any one of SEQ ID NOs: 3 to 7.

In certain embodiments, aptamers of the invention comprise or consist of a nucleic acid sequence comprising at least about 30, 35, 40, 45 or more consecutive nucleotides (e.g. up to the total length) of a sequence having at least 85%, at least 90%, at least 95%, at least 96%, at least 97%, at least 98%, at least 99% or more identity with any one of SEQ ID NOs: 3 to 6.

In certain embodiments, aptamers of the invention comprise or consist of a nucleic acid sequence comprising at least about 30, 35, 40, 45 or more consecutive nucleotides of a sequence having at least 85%, at least 90%, at least 95%, at least 96%, at least 97%, at least 98%, at least 99% or more identity with SEQ ID NO: 3

In certain embodiments, aptamers of the invention comprise or consist of a nucleic acid sequence comprising at least about 30, 35, 40, 45, 46, 47, 48, 49, 50 or more consecutive nucleotides of a sequence having at least 85%, at least 90%, at least 95%, at least 96%, at least 97%, at least 98%, at least 99% or more identity with any one of SEQ ID NOs 10 to 12.

In certain embodiments, aptamers of the invention comprise or consist of a nucleic acid sequence comprising at least about 30, 35, 40, 45, 46, 47, 48, 49, 50 or more consecutive nucleotides of a sequence having at least 85%, at least 90%, at least 95%, at least 96%, at least 97%, at least 98%, at least 99% or more identity with SEQ ID NO: 10 or 11.

In certain embodiments, aptamers of the invention comprise or consist of a nucleic acid sequence comprising at least about 30, 35, 40, 45, 46, 47, 48, 49, 50 or more consecutive nucleotides of a sequence having at least 85%, at least 90%, at least 95%, at least 96%, at least 97%, at least 98%, at least 99% or more identity with SEQ ID NO: 10.

The aptamers of the invention may comprise natural or non-natural nucleotides and/or base derivatives (or combinations thereof). In certain embodiments, the aptamers comprise one or more modifications such that they comprise a chemical structure other than deoxyribose, ribose, phosphate, adenine (A), guanine (G), cytosine (C), thymine (T), or uracil (U). The aptamers may be modified at the nucleobase, at the sugar or at the phosphate backbone.

In certain embodiments, the aptamers comprise one or more modified nucleotides. Exemplary modifications include for example nucleotides comprising an alkylation, arylation or acetylation, alkoxylation, halogenation, amino group, or another functional group. Examples of modified nucleotides include 2'-fluoro ribonucleotides, 2'-NH$_2$—, 2'-OCH$_3$— and 2'-O-methoxyethyl ribonucleotides, which are used for RNA aptamers.

The aptamers of the invention may be wholly or partly phosphorothioate or DNA, phosphorodithioate or DNA, phosphoroselenoate or DNA, phosphorodiselenoate or DNA, locked nucleic acid (LNA), peptide nucleic acid (PNA), N3'-P5'phosphoramidate RNA/DNA, cyclohexene nucleic acid (CeNA), tricyclo DNA (tcDNA) or spiegelmer, or the phosphoramidate morpholine (PMO) components or any other modification known to those skilled in the art (see also Chan et al., Clinical and Experimental Pharmacology and Physiology (2006) 33, 533-540).

Some of the modifications allow the aptamers to be stabilised against nucleic acid-cleaving enzymes. In the stabilisation of the aptamers, a distinction can generally be made between the subsequent modification of the aptamers and the selection with already modified RNA/DNA. The stabilisation does not significantly affect the affinity of the modified RNA/DNA aptamers but prevents the rapid decomposition of the aptamers in an organism or biological solutions by RNases/DNases. An aptamer is referred to as stabilised in the context of the present invention if the half-life in the sample (e.g. biological medium) is greater than one minute, preferably greater than one hour, more preferably greater than one day. The aptamers may also be modified with reporter molecules which, in addition to the detection of the labelled aptamers, may also contribute to increasing the stability.

Aptamers are characterised by the formation of a specific three-dimensional structure that depends on the nucleic acid sequence. The three-dimensional structure of an aptamer arises due to Watson and Crick intramolecular base pairing, Hoogsteen base pairing (quadruplex), wobble pair formation or other non-canonical base interactions. This structure enables aptamers, analogous to antigen-antibody binding, to bind target structures accurately. A nucleic acid sequence of an aptamer may, under defined conditions, have a three-dimensional structure that is specific to a defined target structure.

In certain embodiments, the aptamer comprises a secondary structure as shown in FIG. 1. The secondary structure analysis of the aptamers was performed by means of the free-energy minimization algorithm Mfold (M Zuker. Mfold web server for nucleic acid folding and hybridization prediction. Nucleic Acids Res. 31(13), 3406-3415, 2003). In certain embodiments, the aptamers of the invention may contain the aptamers of the invention may contain at least 1, 2, 3, 4, 5, 6, 7, 8, 9, 10 or more nucleotide variations as compared to any one of SEQ ID NOs: 3 to 7 or 10 to 12. Positions where such variations can be introduced can be determined based on, for example, the secondary structures shown in FIG. 1.

The invention also provides aptamers that compete for binding to Irinotecan with aptamers as described herein. In certain embodiments, the invention provides aptamers that compete for binding to Irinotecan with the aptamers as set forth in any one of SEQ ID NOs: 3 to 7 or 10 to 12. In certain embodiments, competition assays may be used to identify an aptamer that competes for binding to Irinotecan. In an exemplary competition assay, immobilised Irinotecan is incubated in a solution comprising a first labelled aptamer that binds to Irinotecan and a second unlabelled aptamer that is being tested for its ability to compete with the first aptamer for binding to Irinotecan. As a control, immobilised Irinotecan may be incubated in a solution comprising the first labelled aptamer but not the second unlabelled aptamer. After incubation under conditions permissive for binding of the first aptamer to Irinotecan excess unbound aptamer may be removed, and the amount of label associated with immobilised Irinotecan measured. If the amount of label associated with immobilised Irinotecan is substantially reduced in the test sample relative to the control sample, then that indicates that the second aptamer is competing with the first aptamer for binding to Irinotecan.

Immobilisation Oligonucleotides

In certain embodiments, aptamers are detected in the absence of any immobilisation oligonucleotide. For example, aptamers of the invention may be immobilised to a support via a linker sequence as described herein.

In certain embodiments, aptamers of the invention comprise an immobilisation region. The immobilisation region of the aptamer may hybridise over at least a portion of a suitably designed immobilisation oligonucleotide.

In certain embodiments, the immobilisation oligonucleotide comprises a nucleic acid sequence which is configured to hybridise to the immobilisation region of the aptamer over at least a portion of its length. For example, the immobilisation oligonucleotide (or portion thereof) may be configured to form a double-stranded duplex structure with the immobilisation region (or portion thereof) of the aptamer.

In certain embodiments, the immobilisation oligonucleotide is between about 10 to about 20 nucleotides in length, e.g. 10, 11, 12, 13, 14, 15, 16, 17, 18, 19 or 20 nucleotides in length. Typically, the immobilisation oligonucleotide is complementary to an immobilisation region of the aptamer. In certain embodiments, the immobilisation oligonucleotide is a "universal" oligonucleotide capable of hybridising to immobilisation regions included in a plurality of aptamers.

In certain embodiments, the immobilisation oligonucleotide or aptamer comprises a linker portion with a suitable functional moiety to allow surface attachment of the immobilisation oligonucleotide. The functional moiety may be selected from biotin, thiol, amine or other suitable groups known to those skilled in the art.

In certain embodiments, the immobilisation oligonucleotide or aptamer comprises a spacer molecule e.g. a spacer molecule selected from a polynucleotide molecule, a C6 spacer molecule, a C12 spacer molecule, another length C spacer molecule, a hexaethylene glycol molecule, a hexanediol, and/or a polyethylene glycol. The linker may be for example a biotin linker. In certain embodiments, the immobilisation oligonucleotide or aptamer may be conjugated to streptavidin, avidin and/or neutravidin.

In certain embodiments, the immobilisation oligonucleotide or aptamer may be modified for attachment to the support surface. For example, the immobilisation oligonucleotide or aptamer may be attached via a silane linkage. The immobilisation oligonucleotide or aptamer may be succinylated (e.g. to attach the immobilisation oligonucleotide or aptamer to aminophenyl or aminopropyl-derivatised glass). Aptly, the support is aminophenyl or aminopropyl-derivatised. In certain embodiments, the immobilisation oligonucleotide or aptamer comprises a $NH_2$ modification (e.g. to attach to epoxy silane or isothiocyanate coated glass). Typically, the support surface is coated with an epoxy silane or isothiocyanate. In certain embodiments, the immobilisation oligonucleotide or aptamer is hydrazide-modified in order to attach to an aldehyde or epoxide molecule.

Support

In certain embodiments, the aptamer or immobilisation oligonucleotide is attached to a support. Typically, the support is a solid support such as a membrane or a bead. The support may be a two-dimensional support e.g. a microplate or a three-dimensional support e.g. a bead. In certain embodiments, the support may comprise at least one magnetic bead.

In certain embodiments, the support may comprise at least one nanoparticle e.g. gold nanoparticles or the like. In yet further embodiments, the support comprises a microtiter or other assay plate, a strip, a membrane, a film, a gel, a chip, a microparticle, a nanofiber, a nanotube, a micelle, a micropore, a nanopore or a biosensor surface. In certain embodiments, the biosensor surface may be a probe tip surface, a biosensor flow-channel or similar.

In certain embodiments, the aptamer or immobilisation oligonucleotide may be attached, directly or indirectly, to a magnetic bead, which may be e.g. carboxy-terminated, avidin-modified or epoxy-activated or otherwise modified with a compatible reactive group.

Immobilisation of oligonucleotides to a support e.g. a solid phase support can be accomplished in a variety of ways and in any manner known to those skilled in the art for immobilising DNA or RNA on solids. The immobilisation of aptamers on nanoparticles is e.g. as described in WO2005/13817. For example, a solid phase of paper or a porous material may be wetted with the liquid phase aptamer, and the liquid phase subsequently volatilised leaving the aptamer in the paper or porous material.

In certain embodiments, the support comprises a membrane, e.g. a nitrocellulose, a polyethylene (PE), a polytetrafluoroethylene (PTFE), a polypropylene(PP), a cellulose acetate (CA), a polyacrylonitrile (PAN), a polyimide (PI), a polysulfone (PS), a polyethersulfone (PES) membrane or an inorganic membrane comprising aluminium oxide (Al2O3), silicon oxide (SiO2) and/or zirconium oxide (ZrO2). Particularly suitable materials from which a support can be made include for example inorganic polymers, organic polymers, glasses, organic and inorganic crystals, minerals, oxides, ceramics, metals, especially precious metals, carbon and semiconductors. A particularly suitable organic polymer is a polymer based on polystyrene. Biopolymers, such as cellulose, dextran, agar, agarose and Sephadex, which may be functionalised, in particular as nitrocellulose or cyanogen bromide Sephadex, can be used as polymers which provide a solid support.

Detectable Labels

In certain embodiments, the aptamers of the invention are used to detect and/or quantify the amount of Irinotecan in a sample. Typically, the aptamers comprise a detectable label. Any label capable of facilitating detection and/or quantification of the aptamers may be used herein.

In certain embodiments, the detectable label is a fluorescent moiety, e.g. a fluorescent/quencher compound. Fluorescent/quencher compounds are known in the art. See, for example, Mary Katherine Johansson, Methods in Molecular Biol. 335: Fluorescent Energy Transfer Nucleic Acid Probes: Designs and Protocols, 2006, Didenko, ed., Humana Press, Totowa, NJ, and Marras et al., 2002, Nucl. Acids Res. 30, e122 (incorporated by reference herein).

In certain embodiments, the detectable label is FAM. In certain embodiments, the FAM-label is situated at a first or second primer region of the aptamer. The person skilled in the art would understand that the label could also be located at any suitable position within the aptamer. Moieties that result in an increase in detectable signal when in proximity of each other may also be used herein, for example, as a result of fluorescence resonance energy transfer ("FRET"); suitable pairs include but are not limited to fluoroscein and tetramethylrhodamine; rhodamine 6G and malachite green, and FITC and thiosemicarbazole, to name a few.

In certain embodiments, the detectable label is selected from a fluorophore, a nanoparticle, a quantum dot, an enzyme, a radioactive isotope, a pre-defined sequence portion, a biotin, a desthiobiotin, a thiol group, an amine group, an azide, an aminoallyl group, a digoxigenin, an antibody, a catalyst, a colloidal metallic particle, a colloidal non-metallic particle, an organic polymer, a latex particle, a nanofiber, a nanotube, a dendrimer, a protein, and a liposome.

In certain embodiments, the detectable label is a fluorescent protein such as Green Fluorescent Protein (GFP) or any other fluorescent protein known to those skilled in the art.

In certain embodiments, the detectable label is an enzyme. For example, the enzyme may be selected from horseradish peroxidase, alkaline phosphatase, urease, β-galactosidase or any other enzyme known to those skilled in the art.

In certain embodiments, the nature of the detection will be dependent on the detectable label used. For example, the label may be detectable by virtue of its colour e.g. gold nanoparticles. A colour can be detected quantitatively by an optical reader or camera e.g. a camera with imaging software.

In certain embodiments, the detectable label is a fluorescent label e.g. a quantum dot. In such embodiments, the detection means may comprise a fluorescent plate reader, strip reader or similar which is configured to record fluorescence intensity.

In embodiments in which the detectable label is an enzyme label, the detection means may, for example, be colorimetric, chemiluminescence and/or electrochemical (for example, using an electrochemical detector). Typically, electrochemical sensing is through conjugation of a redox reporter (e.g. methylene blue or ferrocene) to one end of the aptamer and a sensor surface to the other end. Typically, a change in aptamer conformation upon target binding changes the distance between the reporter and sensor to provide a readout.

In certain embodiments, the detectable label may further comprise enzymes such as horseradish peroxidase (HRP), Alkaline phosphatase (APP) or similar, to catalytically turnover a substrate to give an amplified signal.

In certain embodiments, the invention provides a complex (e.g. conjugate) comprising aptamers of the invention and a detectable molecule. Typically, the aptamers of the invention are covalently or physically conjugated to a detectable molecule.

In certain embodiments, the detectable molecule is a visual, optical, photonic, electronic, acoustic, opto-acoustic, mass, electrochemical, electro-optical, spectrometric, enzymatic, or otherwise physically, chemically or biochemically detectable label.

In certain embodiments, the detectable molecule is detected by luminescence, UV/VIS spectroscopy, enzymatically, electrochemically or radioactively. Luminescence refers to the emission of light. For example, photoluminescence, chemiluminescence and bioluminescence are used for detection of the label. In photoluminescence or fluorescence, excitation occurs by absorption of photons. Exemplary fluorophores include, without limitation, bisbenzimidazole, fluorescein, acridine orange, Cy5, Cy3 or propidium iodide, which can be covalently coupled to aptamers, tetramethyl-6-carboxyhodamine (TAMRA), Texas Red (TR), rhodamine, Alexa Fluor dyes (et al. Fluorescent dyes of different wavelengths from different companies).

In certain embodiments, the detectable molecule is a colloidal metallic particle, e.g. gold nanoparticle, colloidal non-metallic particle, quantum dot, organic polymer, latex particle, nanofiber (e.g. carbon nanofiber), nanotube (e.g. carbon nanotube), dendrimer, protein or liposome with signal-generating substances. Colloidal particles can be detected colourimetrically.

In certain embodiments, the detectable molecule is an enzyme. In certain embodiments, the enzyme may convert substrates to coloured products, e.g. peroxidase, luciferase, β-galactosidase or alkaline phosphatase. For example, the colourless substrate X-gal is converted by the activity of β-galactosidase to a blue product whose colour is visually detected.

In certain embodiments, the detection molecule is a radioactive isotope. The detection can also be carried out by means of radioactive isotopes with which the aptamer is labelled, including but not limited to 3H, 14C, 32P, 33P, 35S or 125I, more preferably 32P, 33P or 125I. In the scintillation counting, the radioactive radiation emitted by the radioactively labelled aptamer target complex is measured indirectly. A scintillator substance is excited by the isotope's radioactive emissions. During the transition of the scintillation material, back to the ground state, the excitation energy is released again as flashes of light, which are amplified and counted by a photomultiplier.

In certain embodiments, the detectable molecule is selected from digoxigenin and biotin. Thus, the aptamers may also be labelled with digoxigenin or biotin, which are bound for example by antibodies or streptavidin, which may in turn carry a label, such as an enzyme conjugate. The prior covalent linkage (conjugation) of an aptamer with an enzyme can be accomplished in several known ways. Detection of aptamer binding may also be achieved through labelling of the aptamer with a radioisotope in an RIA (radioactive immunoassay), preferably with 125I, or by fluorescence in a FIA (fluoroimmunoassay) with fluorophores, preferably with fluorescein or FITC.

Apparatus

The apparatus according to the invention may be provided in a number of different formats. In certain embodiments, the invention provides apparatus for detecting the presence, absence or level of Irinotecan in a sample, the apparatus comprising an aptamer as described herein.

In certain embodiments, the apparatus comprises a support as described herein. For example, in the absence of Irinotecan, the aptamer may be secured directly or indirectly to a support to immobilise it.

In certain embodiments, the apparatus comprises an immobilisation oligonucleotide as described herein.

In certain embodiments, the aptamer may be attached by way of hybridising to the immobilisation oligonucleotide which is in turn directly or indirectly attached to the support. Alternatively, the aptamer itself may be attached directly or indirectly (e.g. via a linker) to the support surface. In this embodiment, the immobilisation oligonucleotide is configured to hybridise to at least a portion of the aptamer. In this embodiment, the disruption of the interaction between the immobilisation oligonucleotide and aptamer may be measured as an indirect measurement of the presence of Irinotecan.

Certain embodiments of the present invention utilise the ability of the aptamer to change conformation when it binds to Irinotecan. The conformational change may cause the aptamer to disassociate from the immobilisation oligonucleotide thus releasing either the immobilisation oligonucleotide or the aptamer in complex with Irinotecan depending on which is attached to the support. If Irinotecan is not present, the aptamer does not undergo the conformation change and as such remains hybridised to the immobilisation oligonucleotide.

In certain embodiments, the apparatus comprises a linker molecule attached to the support and wherein the linker molecule is configured to hybridise to the aptamer, and further wherein the immobilisation oligonucleotide is configured to hybridise to the aptamer when the aptamer is hybridised to the linker molecule.

Aptly, a linker molecule is attached to the support and wherein the linker molecule is configured to hybridise to the immobilisation oligonucleotide and further wherein the aptamer is configured to hybridise to the immobilisation oligonucleotide when the immobilisation oligonucleotide is hybridised to the linker molecule. In certain embodiments, the linker molecule is a DNA or an RNA molecule or a mixed DNA/RNA molecule, wherein optionally the linker molecule comprises one or more modified nucleotides.

In certain embodiments, the apparatus may be a biosensor. Biosensors are found in many different formats. In certain embodiments, the biosensor comprises the aptamer and a transducer which converts the binding event between the aptamer and Irinotecan into an electrically quantifiable signal. The biosensor may be comprised in a vessel or a probe or the like.

In addition, the apparatus may further comprise other elements such as a signal processing device, output electronics, a display device, a data processing device, a data memory device and interfaces to other devices. In certain embodiments, a sample containing Irinotecan is brought into contact with the biosensor. Irinotecan may then be identified via the changes in the aptamer properties upon specific binding of Irinotecan to the aptamer.

The sensitivity of the sensor may be influenced by the transducer used. The transducer converts the signal from the binding event, which is proportional to the concentration of the target molecule in the sample, into an electrically quantifiable measurement signal. Signalling occurs due to the molecular interaction between the aptamer and Irinotecan. With a biosensor according to the invention, qualitative, quantitative and/or semi-quantitative analytical information can be obtained.

The measurement in optical transducers can be based on principles of photometry, whereby, for example, colour or luminescence intensity changes are detected. Optical methods include the measurement of fluorescence, phosphorescence, bioluminescence and chemiluminescence, infrared transitions and light scattering. The optical methods also include the measurement of layer thickness changes when Irinotecan is bound to the aptamer. The layer thickness can be measured, for example, by surface plasmon resonance (SPR), reflectometric interference spectroscopy (RIfS), biolayer interferometry (BLI) or similar.

Furthermore, the interference on thin layers (SPR or RIfS) and the change of the evanescent field can be measured. Acoustic transducers use the frequency changes of a piezoelectric quartz crystal, which detects highly sensitive mass changes that occur when target binds to aptamer. The quartz crystal used is placed in an oscillating electric field and the resonant frequency of the crystal is measured. A mass change on the surface of the quartz crystal can be quantified.

In certain embodiments, the apparatus is a BLI (Biolayer Interferometry) apparatus or similar apparatus. BLI is a label-free technology for measuring biomolecular interactions. It is an optical analytical technique that analyses changes in the interference pattern of white light reflected from two surfaces: a layer of immobilised ligand on the biosensor tip, and an internal reference layer. Any change in the number of molecules bound to the biosensor tip causes a shift in the interference pattern that can be measured in real-time. Only molecules binding to or dissociating from the biosensor can shift the interference pattern and generate a response profile on the BLI sensor. Unbound molecules, changes in the refractive index of the surrounding medium, or changes in flow rate do not affect the interference pattern. The displacement selection principle allows development of detection assays based on the duplex formation between the immobilisation sequence of the aptamers and the immobilisation oligonucleotide. The target-dependent conformational change may lead to the release of the aptamer from the duplex structure. This switch from the hybridised duplex to the displaced stage of the aptamer can be used to generate a recordable signal, target concentration dependent signal.

Depending on the design, qualitative, quantitative and/or semi-quantitative analytical information about the target to be measured can be obtained with the measuring device. The detection means may be for example a portable meter.

The invention also provides a test strip and/or lateral flow device comprising any aptamer or complex as described herein. Lateral flow devices may also be referred to as lateral flow tests, lateral flow assays and lateral flow immunoassays.

In certain embodiments, the lateral flow device comprises a support onto which an immobilisation oligonucleotide is attached. The immobilisation oligonucleotide is configured to hybridise to at least a portion of an immobilisation region of an aptamer as described herein. Any sample as described herein (e.g. a blood or plasma sample) may be introduced. If the sample comprises Irinotecan, the aptamer may bind to Irinotecan and undergo a conformational change, resulting in the aptamer disassociating from the immobilisation oligonucleotide.

In certain embodiments, the apparatus may be suitable for use in assays such as ELISA (enzyme-linked immunosorbent assay). When aptamers are used in place of antibodies, the resulting assay is often referred to as an "ELONA" (enzyme-linked oligonucleotide assay), "ELASA" (enzyme linked aptamer sorbent assay), "ELAA" (enzyme-linked aptamer assay) or similar. Incorporating aptamers into these ELISA-like assay platforms can result in increased sensitivity, allow a greater number of analytes to be detected; including analytes for which there are no antibodies available and a wide range of outputs, since aptamers can be conjugated to multiple reporter molecules including fluorophores, quencher molecules and/or any other detection moiety as described herein.

In certain embodiments, the apparatus may comprise a vessel. The aptamer specific to Irinotecan may be immobilised via hybridisation to an immobilisation oligonucleotide in the vessel (e.g. the surface of the vessel). A sample which may contain Irinotecan may be added to the vessel. If the sample contains Irinotecan, this target may bind to the aptamer resulting in a conformational change which in turn results in displacement of the aptamer from the immobilisation oligonucleotide. The displaced aptamer may then be detected using any suitable method described herein.

Methods of Detecting Irinotecan

In certain embodiments, the invention provides methods for detecting the presence, absence or amount of Irinotecan in a sample.

In certain embodiments, the sample is synthetic (e.g. non-biological). For example, the sample may be a pharmaceutical composition comprising (or suspected of comprising) Irinotecan. In certain embodiments, the invention provides a method for quantifying the amount of Irinotecan during manufacture of a pharmaceutical composition.

In certain embodiments, the sample is biological. For example, the sample may comprise whole blood, leukocytes, peripheral blood mononuclear cells, plasma, serum, sputum, breath, urine, semen, saliva, meningial fluid, amniotic fluid, glandular fluid, lymph fluid, nipple aspirate, bronchial aspirate, synovial fluid, joint aspirate, cells, a cellular extract, stool, tissue, a tissue biopsy or cerebrospinal fluid. Typically, the sample is a blood (e.g. plasma) sample. In certain embodiments, the sample is pre-treated, such as by mixing, addition of enzymes, buffers, salt solutions or markers, or purified.

In certain embodiments, the sample is obtained from a subject undergoing Irinotecan therapy. The subject may be an animal, such as a cat, dog or horse. Typically, the subject is human. Typically, the subject has or is suspected of having a cancer such as colon, pancreatic or lung cancer. For example, the subject may have metastatic colorectal cancer or extensive small cell lung cancer.

In the methods for detecting the presence, absence or amount of Irinotecan in a sample, the sample is interacted (i.e. contacted) with an aptamer of the invention. For example, the sample and aptamers of the invention may be incubated under conditions sufficient for at least a portion of the aptamer to bind to Irinotecan in the sample.

A person skilled in the art will understand that the conditions required for binding to occur between the aptamers described herein and Irinotecan. In certain embodiments the sample and aptamer may be incubated at temperatures between about 20° C. and about 37° C., preferably about 22° C. In certain embodiments, the sample and aptamer may be diluted to different concentrations (e.g. at least about 1%, 5%, 10%, 20%, 25%, 30%, 40%, 50%, 60%, 70% 80% v/v or more) with appropriate buffers (e.g. PBS or the like). In certain embodiments, the sample and aptamer may be incubated whilst shaking and/or mixing. In certain embodiments, the sample and aptamer are incubated for at least 1 minute, at least 5 minutes, at least 15 minutes, at least 1 hour or more.

In certain embodiments, binding of the aptamer and Irinotecan leads to formation of an aptamer-Irinotecan complex. The binding or binding event can be detected, for example, visually, optically, photonically, electronically, acoustically, opto-acoustically, by mass, electrochemically, electro-optically, spectrometrically, enzymatically or otherwise chemically, biochemically or physically as described herein.

In certain embodiments, the method comprises interacting the sample with the aptamer of the invention and an immobilisation oligonucleotide as described herein. As discussed above, binding of Irinotecan may cause a conformational change in the aptamer resulting in its displacement from the immobilisation oligonucleotide. For example, where the immobilisation oligonucleotide is attached to a support, binding of Irinotecan to the aptamer may result in displacement of the aptamer from the support.

In certain embodiments, the binding of the aptamer to the immobilisation oligonucleotide is carried out prior to immobilisation of the immobilisation oligonucleotide to the support. In an alternative embodiment, the immobilisation oligonucleotide is attached to the support prior to hybridisation of the nucleic acid molecule to the immobilisation oligonucleotide. Either the immobilisation oligonucleotide and/or the nucleic acid molecule may be attached to the support. The attachment may be directly or indirectly e.g. via a linker or other attachment moiety.

The binding of aptamer and Irinotecan may be detected using any suitable technique. As discussed above, for example, binding of the aptamer and Irinotecan may be detected using a biosensor. In certain embodiments, binding of the aptamer and Irinotecan is detected using SPR, RIfS, BLI, LFD or ELONA as described herein.

Advantageously, the aptamers described herein allow detection of clinically effective amounts of Irinotecan. For example, the aptamers described herein may allow the detection of between about 10 ng to about 10,000 ng/ml of Irinotecan. Thus, the aptamers are capable of binding to Irinotecan with high specificity and affinity and allow clinical ranges of active Irinotecan to be detected in a sample.

Methods of Detecting SN-38

In certain embodiments, the invention provides methods for detecting the presence, absence or amount of SN-38 in any sample as described herein.

Advantageously, the CP11 aptamers described herein (e.g. any one of SEQ ID NOs:10 to 12) are capable of binding specifically to Irinotecan and SN-38, whilst the CP13 aptamers described herein (e.g. any one of SEQ ID NOs 3 to 7) are capable of binding specifically to Irinotecan and do not bind or bind with low affinity to SN-38. Thus, these aptamers can be used in combination to determine the ratio between Irinotecan and its active metabolite SN-38. This allows the amount of SN-38 in the sample to be quantified.

In certain embodiments, the method comprises interacting the sample with a first aptamer (e.g. CP13 aptamer or fragment thereof), wherein the aptamer comprises or consists of:
- (a) a nucleic acid sequence selected from any one of SEQ ID NOs: 3 to 7;
- (b) a nucleic acid sequence selected from any one of SEQ ID NOs: 3 to 6;
- (c) a nucleic acid sequence selected from SEQ ID NO: 3;
- (d) a nucleic acid sequence having at least about 85%, 90%, 95% identity or more with any one of the sequences of (a) to (c); and/or
- (e) a nucleic acid sequence having at least about 30, 35, 40 or more consecutive nucleotides of any one of the sequences of (a) to (d);

wherein the aptamer does not bind or binds with only low affinity to SN-38.

In certain embodiments, the method further comprises interacting the sample with a second aptamer (e.g. CP11 or fragment thereof), wherein the aptamer comprises or consists of:
- (a) a nucleic acid sequence selected from any one of SEQ ID Nos: 10 to 12;
- (b) a nucleic acid sequence selected from SEQ ID NO: 10 or 11;
- (c) a nucleic acid sequence selected from SEQ ID NO: 10;
- (d) a nucleic acid sequence having at least about 85%, 90%, 95% or more identity with any one of the sequences of (a) to (c); and/or
- (e) a nucleic acid sequence having at least about 30, 35, 40 or more consecutive nucleotides of any one of the sequences of (a) to (c);

wherein the aptamer is also capable of specifically binding to SN-38.

In certain embodiments, the method comprises detecting the presence, absence or amount of Irinotecan using the first aptamer. In certain embodiments, the method further comprises detecting the presence, absence or amount of Irinotecan and SN-38 using the second aptamer. The presence, absence or amount of Irinotecan and/or SN-38 may be detected using any suitable method, including but not limited to any of the methods described herein.

In certain embodiments, the method further comprises comparing the amount of Irinotecan detected using the first aptamer with the amount of Irinotecan and SN-38 detected using the second aptamer. The amount of Irinotecan and/or SN-38 can be calculated, for example, using appropriate calibration curves of the aptamers and the respective target (s).

In certain embodiments, the method further comprises comparing the amount of Irinotecan detected using the first aptamer with the amount of Irinotecan and SN-38 detected using the second aptamer. For example, the amount of Irinotecan detected using the first aptamer may be divided by the total amount of Irinotecan and SN-38 detected using the second aptamer to determine the ratio of Irinotecan to SN-38 in the sample.

In certain embodiments, the amount of Irinotecan detected using the first aptamer may be divided by the total amount of Irinotecan and SN-38 detected using the second aptamer to determine the presence, absence or amount of SN-38 in the sample.

Advantageously, the aptamers described herein allow detection of clinically effective amounts of Irinotecan. For example, the aptamers described herein may allow the detection of between about 0.1 to 100 ng/ml SN-38. Thus, the aptamers are capable of binding to Irinotecan with high specificity and affinity and allow clinical ranges of active Irinotecan to be detected in a sample.

Monitoring of Irinotecan During Cancer Treatment

In certain embodiments, the invention provides a method of monitoring the level of Irinotecan and/or SN-38 in a sample obtained from a subject undergoing Irinotecan therapy. Thus, the invention provides the opportunity to adjust treatment regime based on the subject's individual needs, allowing more effective and personalised treatment.

In certain embodiments, the invention provides the detection of the amount of Irinotecan and/or SN-38 in a sample obtained from the subject according to any method described herein, followed by treating or preventing cancer in the subject according to the level of Irinotecan that is detected.

In certain embodiments, the method comprises administering a dose (e.g. initial dose) of Irinotecan to the subject following the detection of the amount of Irinotecan and/or SN-38 in a sample obtained from the subject.

Typically, the cancer is colon (e.g. metastatic colorectal), pancreatic or lung (e.g. extensive small cell lung). Typically, the subject is human. Typically, the subject is an adult human.

The initial dose of Irinotecan is a therapeutically or prophylactically effective amount of Irinotecan administered to the subject. Typically, the initial dose of Irinotecan is injected (e.g. intravenous).

The initial dose may be determined according to various parameters, especially the age, weight and condition of the subject to be treated and the required regimen. A physician will be able to determine the required route of administration and dosage for any subject.

In certain embodiments, an adult with metastatic colorectal cancer is treated with an initial intravenous dose 125 mg/m$^2$ of Irinotecan over 90 minutes on days 1, 8, 15 and 22 (for example, optionally in combination with an intravenous dose 20 mg/m$^2$ of leucovorin, followed by an intravenous dose 500 mg/m$^2$ of 5-fluoroacil on days 1, 8, 16 and 22).

In certain embodiments, an adult with extensive small cell lung cancer is treated with an initial intravenous dose 60 mg/m$^2$ of Irinotecan over 90 minutes on days 1, 8 and 15 (for example, optionally in combination with an intravenous dose 60 mg/m$^2$ of cisplatin on day 1). In the methods of treating or preventing cancer, the level of Irinotecan and/or SN-38 in a sample from the subject is detected according to the methods described herein. Typically, the sample is a blood sample. Typically, the plasma trough level (Cmin) of Irinotecan in the blood sample is detected (e.g. the lowest concentration reached by Irinotecan before the next dose of Irinotecan is administered).

If the level of Irinotecan and/or SN-38 is determined to be below a lower threshold level, an increased dose of Irinotecan may be administered to the subject. Herein, a "lower threshold level" is understood to mean any plasma level of Irinotecan and/or SN-38 that is considered not likely to lead to tumour response in the subject. The skilled person may select an appropriate lower threshold level, depending, for example, on the type of cancer and/or the age, sex or size of the subject. See also, for example, Adiwijaya B S, Kim J, Lang I, et al. Clin. Pharmacol. Ther. 2017; 102(6):997-1005 (incorporated by reference herein).

In certain embodiments, the lower threshold level of Irinotecan may be about 50 ng/ml, about 40 ng/ml, about 30 ng/ml, about 10 ng/ml, about 5 ng/ml or less.

In certain embodiments, the lower threshold level of SN-38 may be about 1 ng/ml, about 0.5 ng/ml, about 0.4 ng/ml, about 0.3 ng/ml, about 0.2 ng/ml, about 0.1 ng/ml, about 0.05 ng/ml or less.

An "increased dose" may mean a higher dose than the initial dose that acts to increase the level of Irinotecan in a further sample to above the lower threshold level. The skilled person would be able to calculate a suitable increased dose, based, for example, on the initial dose of Irinotecan and the level of Irinotecan in the sample.

If the level of Irinotecan and/or SN-38 is determined to be above an upper threshold level, a decreased dose of Irinotecan may be administered to the subject. Herein, an "upper threshold level" is understood to mean any plasma level of Irinotecan and/or SN-38 that is considered likely to lead to toxicity (e.g. neutropenia and/or diarrhoea) in the subject. The skilled person may select an appropriate upper threshold level, depending, for example, on the type of cancer and/or the age, sex or size of the subject. See also, for example, Adiwijaya B S, Kim J, Lang I, et al. Clin Pharmacol. Ther. 2017; 102(6):997-1005 (incorporated by reference herein).

In certain embodiments, the upper threshold level of Irinotecan may be about 3,000 ng/ml, about 4,000 ng/ml, about 5,000 ng/ml, about 6,000 ng/ml, about 7,000 ng/ml, about 8,000 ng/ml, about 9,000 ng/ml, about 10,000 ng/ml, about 15,000 ng/ml or more.

In certain embodiments, the upper threshold level of SN-38 may be about 3 ng/ml, about 5 ng/ml, about 10 ng/ml, about 20 ng/ml, about 30 ng/ml, about 40 ng/ml, about 50 ng/ml, about 60 ng/ml, about 70 ng/ml, about 80 ng/ml, about 90 ng/ml about 100 ng/ml or more.

A "decreased dose" is understood to mean a lower dose than the initial dose that decreases the level of Irinotecan to a level more likely to reduce toxicity in the subject. The skilled person would be able to calculate a suitable decreased dose, based on the initial dose of Irinotecan and the level of Irinotecan in the sample. In certain embodiments, the administration of Irinotecan is stopped.

If the level of SN-38 is determined to be below a lower threshold level, an increased dose of Irinotecan may be administered to the subject. An "increased dose" may also be understood to mean a higher dose than the initial dose that increases the level of SN-38 to a level more likely to lead to a tumour response in the subject. The skilled person would be able to calculate a suitable increased dose, based on the initial dose of Irinotecan and the level of SN-38 in the sample.

If the level of SN-38 is determined to be above an upper threshold level, a decreased dose of Irinotecan may be administered to the subject. A "decreased dose" is understood to mean a lower dose than the initial dose that decreases the level of SN-38 to a level more likely to reduce toxicity in the subject. The skilled person would be able to calculate a suitable decreased dose, based on the initial dose of Irinotecan and the level of SN-38 in the sample. In certain embodiments, the administration of Irinotecan is stopped.

In certain embodiments, the lower threshold level of Irinotecan is about 10 ng/ml and/or the upper threshold level of Irinotecan is about 10,000 ng/ml.

In certain embodiments, the lower threshold level of Irinotecan is about 5 ng/ml and/or the upper threshold level of Irinotecan is about 2,000 ng/ml.

In certain embodiments, the lower threshold level of SN-38 is about 0.5 ng/ml and/or the upper threshold level of SN-38 is about 100 ng/ml.

In certain embodiments, lower threshold level of SN-38 is about 0.1 ng/ml and/or the upper threshold level of SN-38 is about 25 ng/ml.

In certain embodiments, the level of Irinotecan and/or SN-38 is detected within, 4 weeks, 2 months, 3 months, 4 months, 5 months, 6 months or 12 months after administering the initial dose (or cycle) of Irinotecan (optionally in combination with other drugs such as leucovorin, 5-fluoroacil and/or cisplatin) to the subject. The level of Irinotecan may be detected one or more times, for example at regular intervals after commencing Irinotecan treatment. Typically, the level of Irinotecan is detected at about 3, 6 and/or 12 months, allowing monitoring of the therapeutic levels of Irinotecan (and adjusting to target levels as may be necessary) over the first year of Irinotecan treatment.

Kits

The invention also provides a kit for detecting and/or quantifying Irinotecan, wherein the kit comprises one or more aptamers as described herein. Typically, the kit also comprises a detectable molecule as described herein.

In some embodiments, the kit further comprises instructions for use in accordance with any of the methods described herein.

In certain embodiments, the kit further comprises an immobilisation sequence, support and/or linker as described herein.

Typically, the kit comprises further components for the reaction intended by the kit or the method to be carried out, for example components for an intended detection of enrichment, separation and/or isolation procedures. Examples are buffer solutions, substrates for a colour reaction, dyes or enzymatic substrates. In the kit, the aptamer may be provided in a variety of forms, for example pre-immobilised onto a support (e.g. solid support), freeze-dried or in a liquid medium.

The kit of the invention may be used for carrying out any method described herein. It will be appreciated that the parts of the kit may be packaged individually in vials or in combination in containers or multi-container units. Typically, manufacture of the kit follows standard procedures which are known to the person skilled in the art.

EXAMPLES

In the following, the invention will be explained in more detail by means of non-limiting examples of specific embodiments. In the example experiments, standard reagents and buffers free from contamination are used.

Example 1—Aptamer Selection

Single stranded DNA aptamer selection was performed using the displacement selection process. Inserted fluorescence markers allowed the quantification of the DNA after different steps of the process by fluorescence measurement.

During the selection process, the ssDNA oligomers of the aptamer library are immobilised onto magnetic beads via a complimentary immobilisation oligonucleotide. After different washing steps to remove unbound and only weakly bound ssDNA molecules, background elution and subsequent target binding steps are performed under the same conditions. Target binding leads to a conformational change of the aptamers. The conformational change causes the aptamers to disassociate from the immobilisation oligonucleotide thus releasing/displacing the aptamer in complex with the target molecule. If the target molecule is not present, the aptamer molecule does not undergo the conformation change and as such remains hybridised to the immobilisation oligonucleotide.

A direct comparison of the amount of unspecific eluted material during the background step and the amount of aptamers which are displaced due to target-binding enables tracking of the selection process. If target-bound material is exponential enriched compared to unspecific background, the aptamer selection process is successful. The enriched aptamer pool can be used as 'polyclonal aptamer' or individual aptamer molecules can be isolated from the pool.

Stringency during the selection process was enhanced by introducing counter selection steps. In these steps, the immobilised library is immobilised with unspecific/'not-wanted' target molecules to remove ssDNA molecules which have an affinity to these unspecific/'not-wanted' targets.

Aptamer Library and Oligonucleotides

During the selection process, ssDNA oligonucleotide sequences of an aptamer library (manufactured by IDT, Belgium) were immobilised onto magnetic beads via a complementary immobilisation oligonucleotide (SEQ ID NO: 16).

The nucleotide sequences of the aptamer library have the following structure (in a 5' to 3' direction):

P1-R1-I-R2-P2, wherein P1 is a first primer region, R1 is a first randomised region, I is the immobilisation region, R2 is a further randomised region and P2 is a further primer region wherein at least R1 and/or R2 or a portion thereof are involved in target molecule binding.

The following modified primers were used in the amplification of the oligomers by means of PCR: fluorescein (FAM)-labelled forward primer (P1) with the sequence: 5'-/56FAM/ATCCACGCTCTTTTTCTCC-3' and $PO_4$-modified reverse primer (P2) with the sequence: 5'/5Phos/CCTATGTCACCCTCAATGC-3'.

The exemplary biotinylated immobilisation oligonucleotide (I) has the following structure: 5'Bio-GTC-HEGL-GATCGAGCCTCA-3'. All oligonucleotides were chemically synthesised by IDT, Belgium.

The first randomised region (R1) of the library is a sequence of any 10 nucleic acids. The second randomised region (R2) of the library is a sequence of any 40 nucleic acids.

Fluorescence Measurements

Fluorescent markers incorporated into the aptamers allow quantification of the aptamer DNA after different steps of the process, by means of a fluorescence plate reader assay.

Fluorescence measurements of fluorescein (FAM)-labelled DNA were conducted in BMG Fluorescence Plate Reader (FLUOstar OPTIMA, BMG, UK) using the following measuring conditions: excitation 485 nm/emission 520 nm.

Immobilisation of Aptamer Library onto Magnetic Beads

The ssDNA oligomers of the aptamer library are fixed to magnetic beads via the immobilisation oligonucleotide. The immobilisation oligonucleotide contains a defined region of 12 nucleotides which is complementary to a region of the ssDNA starting library which enables hybridisation between both molecules. In addition, the immobilisation oligonucleotide carries a 5' biotin, bound via a hexaethylene glycol (HEGL) residue, which is responsible for the coupling of the immobilisation oligonucleotide to the streptavidin-modified magnetic beads.

For immobilisation, 3 nmol of naïve library and 2 nmol of immobilisation oligonucleotide were prehybridised in 250 µL binding buffer BB (20 mM Tris-HCl pH 7.4, 100 mM NaCl, 5 mM KCl, 2 mM $MgCl_2$, 1 mM $CaCl_2$, 0.01% Tween 20) by heating the mixture for 5 minutes at 95° C. After cooling down to 4° C., the pre-hybridised library-immobilisation oligonucleotide mixture was immobilised onto $10^9$ Dynabeads® M-270 Streptavidin Magnetic Beads (Thermo Fisher Scientific, UK) according to manufacturer's instructions using buffer B&W (5 mM Tris-HCl pH 7.5, 0.5 mM EDTA, 1M NaCl, 0.01% Tween 20).

From round 2 onwards, 300 pmol of FAM-labelled aptamer library and 200 pmol immobilisation oligonucleotide was hybridised in 100 µL binding buffer (BB) using the same protocol as above. The pre-hybridised aptamer library-oligonucleotide mixture was immobilised onto $10^8$ Dynabeads® M-270 Streptavidin Magnetic Beads according to manufacturer's instructions.

In Vitro Selection Using Displacement Approach

DNA aptamer selection was performed using the displacement selection approach. A fluorescence marker incorporated into the aptamer library allows quantification of the aptamer DNA after each step of the process by means of a fluorescence plate reader assay. Fluorescence measurements of fluorescein (FAM)-labelled DNA were conducted using a BMG Fluorescence Plate Reader (FLUOstar OPTIMA, BMG, UK) using the following measuring conditions: excitation 485 nm/emission 520 nm. Quantification of target displaced and recovered aptamer DNA is based on calculation using calibration curves of FAM-labelled ssDNA (oligonucleotide library) with a range of 0-50 pmol/mL, prepared for each aptamer library in the relevant aptamer selection buffer.

The target CPT-11 (Irinotecan hydrochloride, Sigma-Aldrich, UK) was diluted to 1 mg/mL stock solution in DMSO and stored at −20° C. Working stocks were prepared at 10 µM in selection buffer PBS6 (10 mM $Na_2HPO_4$/2 mM $KH_2PO_4$, pH 6.0, 137 mM NaCl, 2.7 mM KCl, 2 mM $MgCl_2$, 1 mM $CaCl_2$, 0.01% Tween 20) immediately before usage. The buffers used in the selection of Irinotecan targeting aptamers are optimized to improve the efficiency of selection Successive rounds of the displacement selection process were carried out as an automated approach using Biomek FX (Cat #717004, Serial #50111125, Beckman-Coulter, USA), comprising the following steps which are also optimized to reduce interactions with unwanted targets, remove weak binding sequences or sequences which are released through mechanical processes; and improve the efficiency of selection against Irinotecan:

Binding of the naïve aptamer library (or the enriched aptamer library prepared from the previous round) to the magnetic beads according to protocol above.

Quantification (fluorescence measurement) of the amount of immobilised aptamer library, input of 500 pmol immobilised naïve library into the first selection round, and input of 80 pmol immobilised aptamer library into every following round of selection Removal of weakly bound oligomers in an elevated temperature wash step at 28° C. for 15 min, in selection buffer PBS6.

Background elution at 22° C. for 45 min, in selection buffer PBS6.

Selection rounds 7-11, also included a counter selection step, either with 10 µM SN-38 (counter selection cs1) or with 10 µM SN-38 in 40% human plasma (HUMANPL32NCU2N, BioIVT, UK) (counter selection cs2) in selection buffer PBS6, at 22° C. for 45 min.

Target binding at 22° C. for 45 min, in selection buffer PBS6 supplemented with the target molecule (10 µM Irinotecan,CPT-11).

After each round of selection, the target-displaced aptamers were separated from the non-displaced oligonucleotides, recovered and directly amplified by semi-asymmetric PCR, using an unequal primer mix (2 µM FAM-labelled forward primer and 0.1 µM $PO_4$-modified reverse primer).

Double stranded DNA is removed by 30 minute treatment with Lambda exonuclease (EURx, Poland) at 37° C. according manufacturers protocol and the nascent ssDNA is purified using AxyPrep Mag PCR Clean-up Kit (Axygen Biosciences, USA) to obtain an enriched aptamer library. The selected and purified aptamer library was used in the subsequent round of displacement selection.

In each round, the amount of aptamer library recovered in the background elution, counter-selection (if applicable) and target binding fractions are quantified by fluorescence measurements. The amount of recovered material in each sample is used to track enrichment of target binding aptamers (relative to background or counter target binders).

Figure 1A:
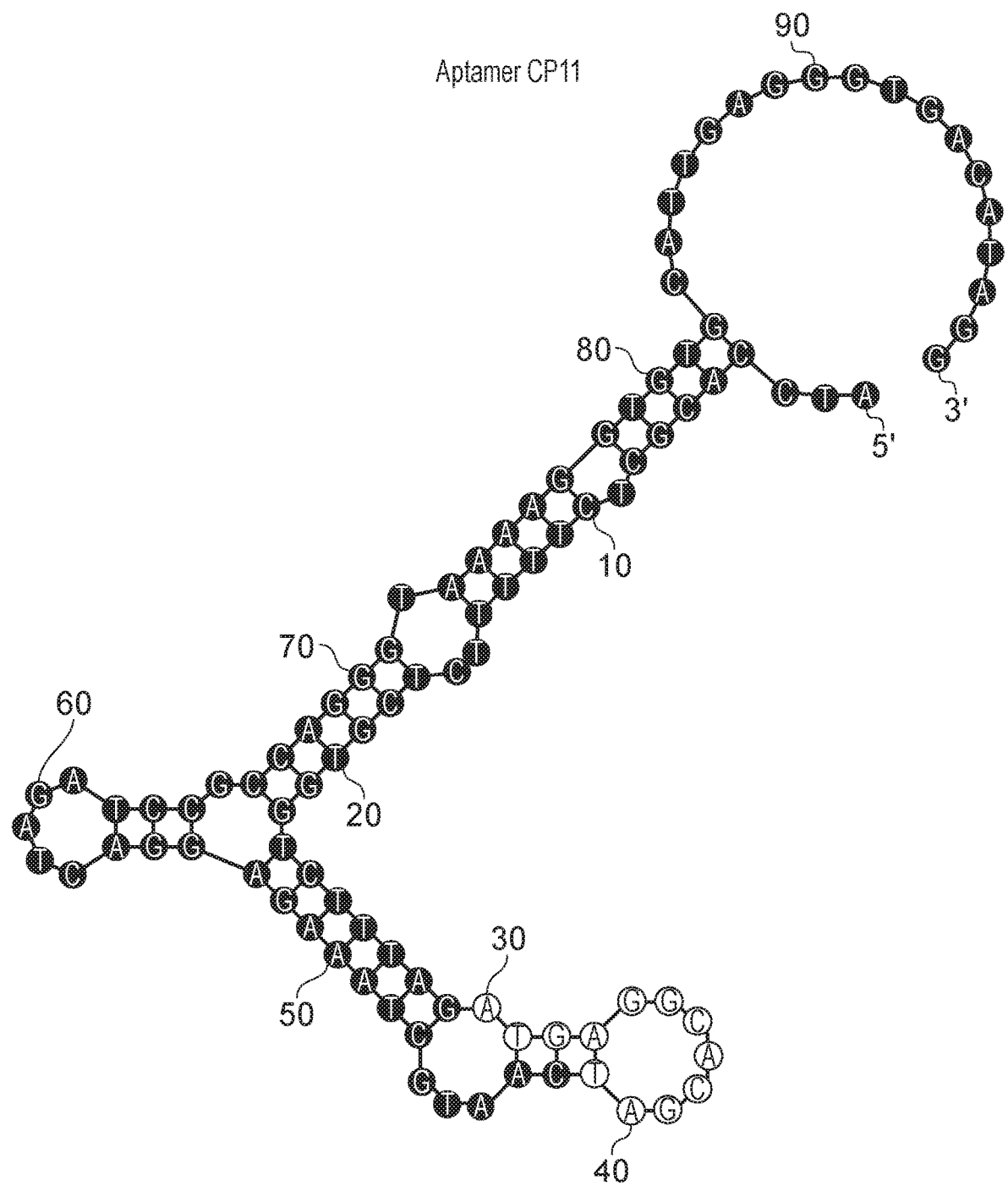
FIG. 1 shows the predicted secondary structure of aptamers against Irinotecan (A—Aptamer CP11 (SEQ ID NO: 12), B—Aptamer CP13 (SEQ ID NO: 7), C—Aptamer fragment CP11-F3e (SEQ ID NO: 10), D—Aptamer fragment CP13-F4c (SEQ ID NO: 3). Secondary structures were determined using Mfold (Zuker, M. (2003) Nucleic Acid Res. 31(13), 3406-15.). The binding site for the immobilisation oligonucleotide is highlighted in white.
Figure 1B:
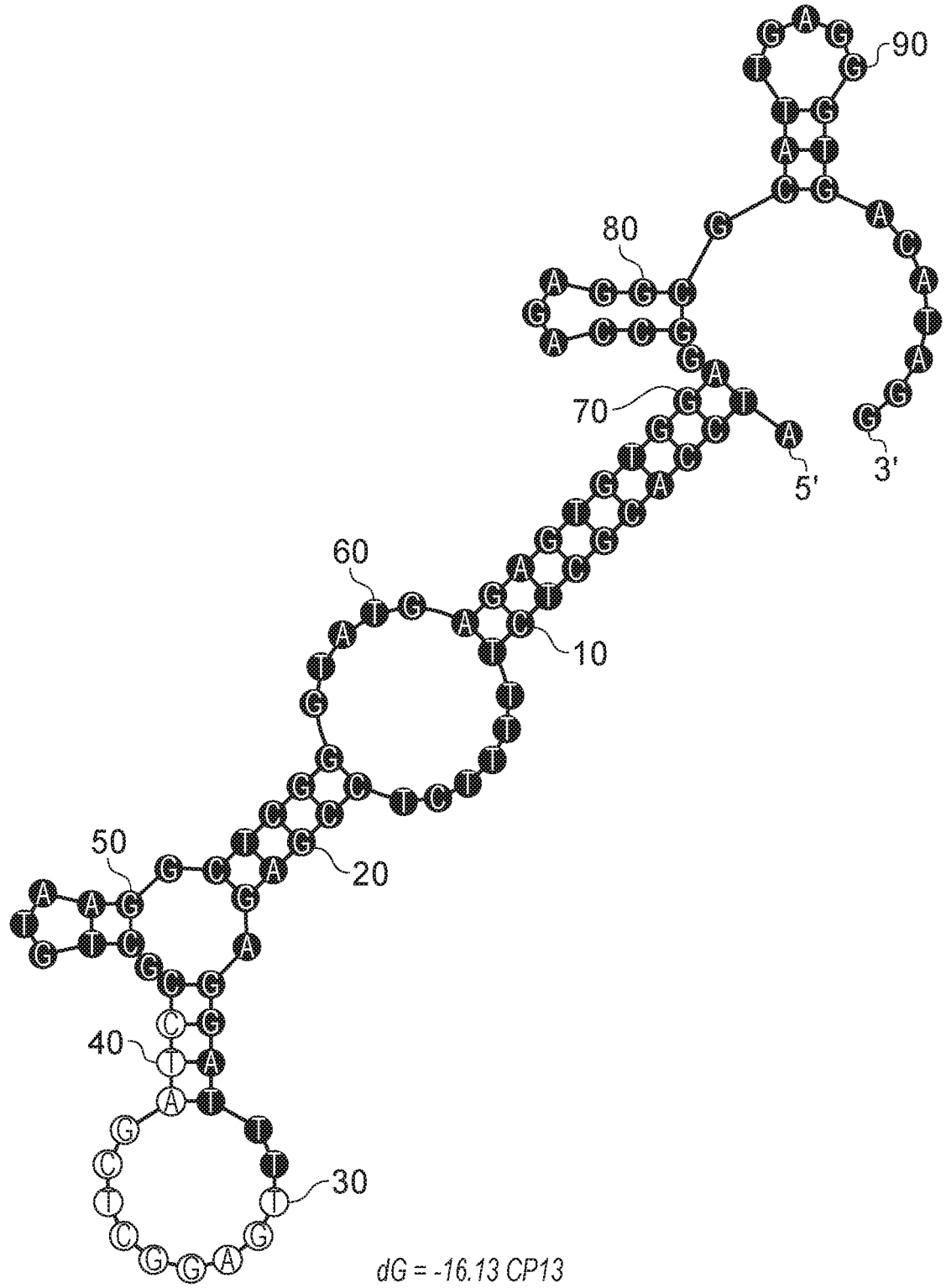
Figure 1C:
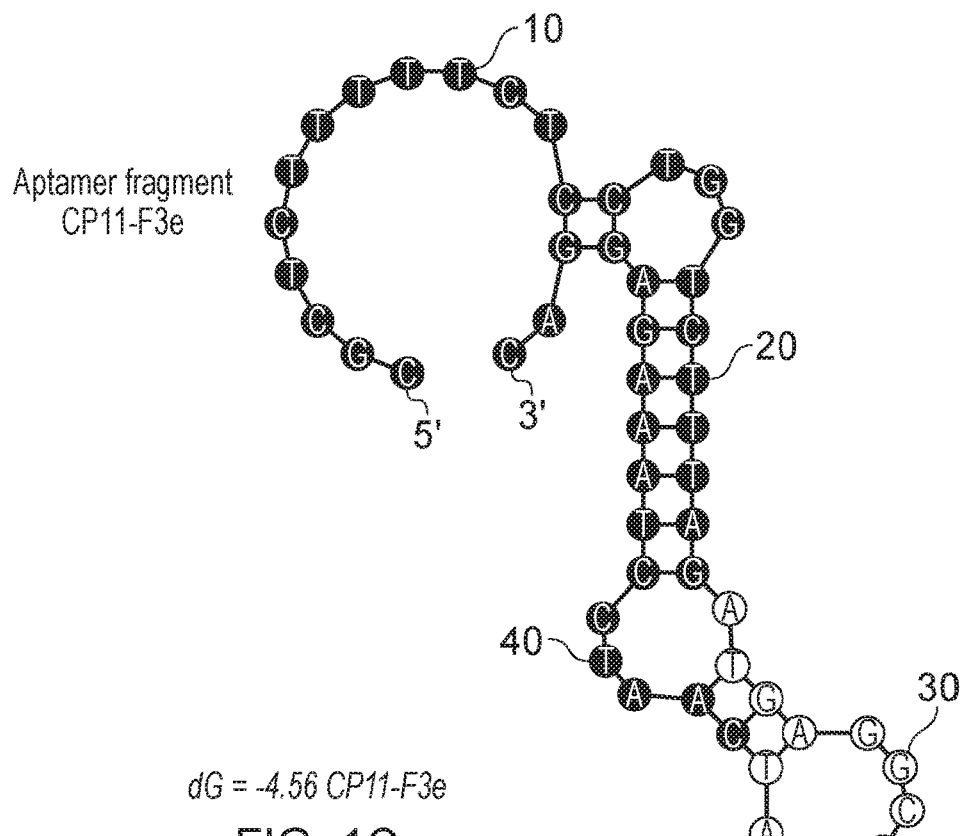
Figure 1D:
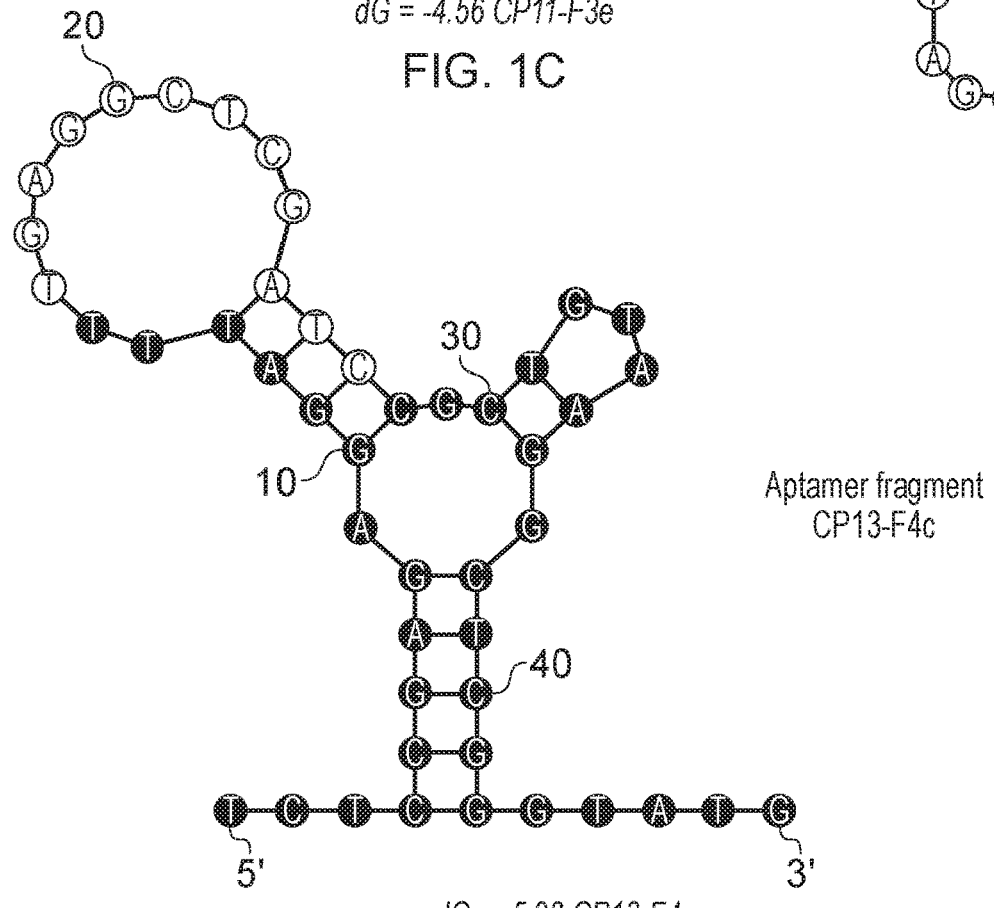
Figure 2:
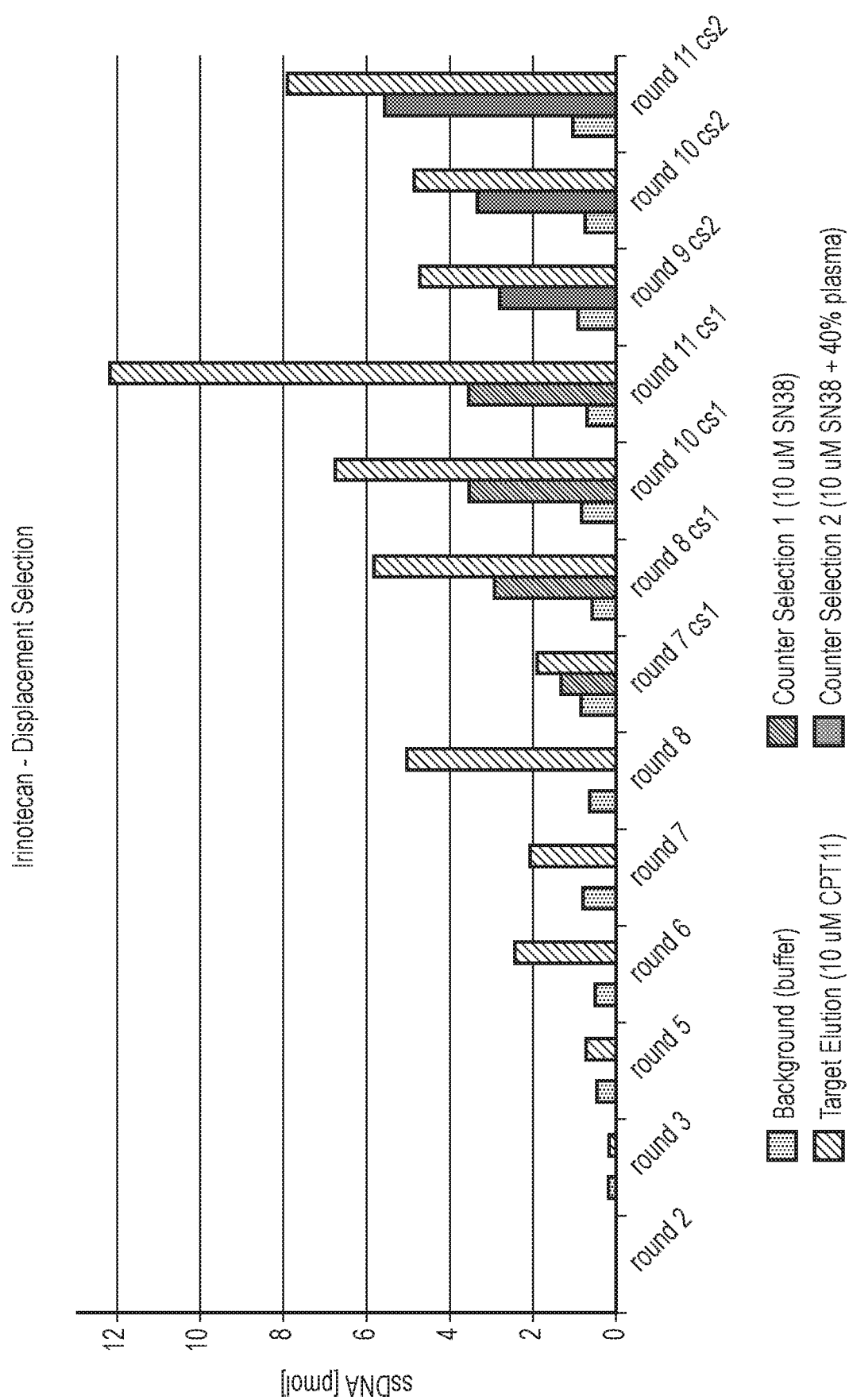
FIG. 2 shows selection of a high affinity aptamer population using a displacement selection approach. The amount of 'displaced' aptamer library is monitored for 'background elution', 'counter-selection' and 'target binding' in every round. Once a significant increase in target-induced displacement is seen (Round 6), counter-selection with SN-38 (cs1), and additionally from round 9 with SN-38 in 40% human plasma (cs2), was included. After rounds 11cs1 and 11cs2, target specific polyclonal populations were isolated.

In total, 11 rounds of this procedure were performed to enrich Irinotecan specific oligonucleotides (aptamers) (see FIG. 2).

Construction of a Biosensor and Evaluation of Aptamer-Target Binding

After the 11th round of selection the enriched aptamer populations IriP cs1 and IriP cs2 were tested for binding specificity for the target molecule Irinotecan (CPT-11) by Biolayer Interferometry (BLI). The experiments described here were conducted using either the BLItz or Octet QK instruments (ForteBio, Pall Life Sciences, USA).

Figure 3:
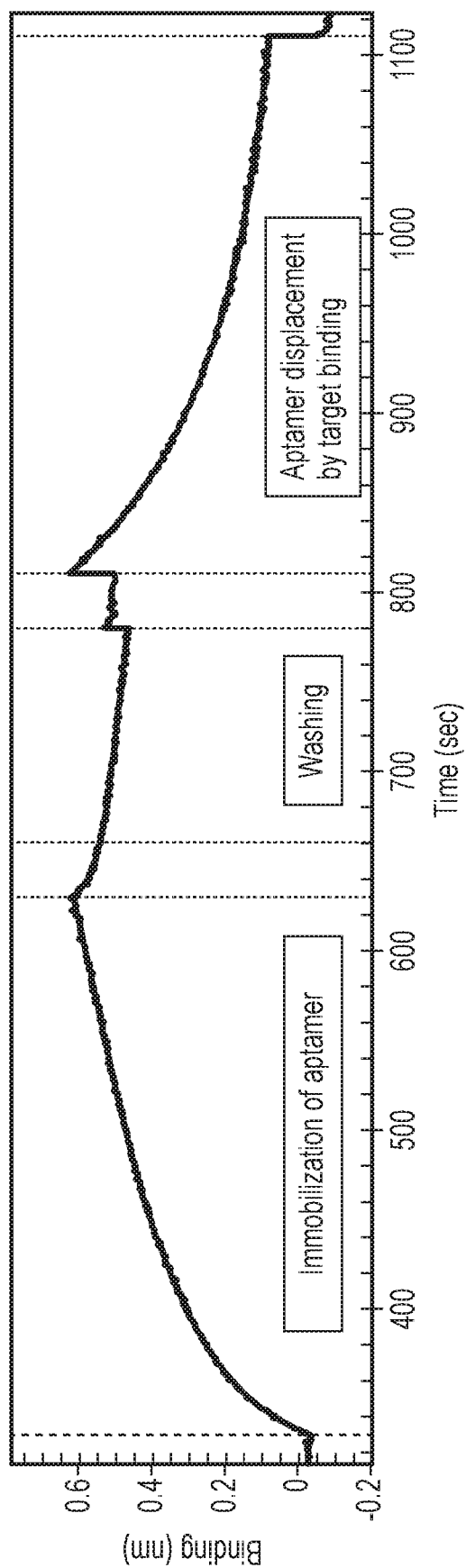
FIG. 3 shows model data for a 'dip and read' Biolayer Interferometry (BLI) assay, used to monitor aptamer binding to its target, identify the best performing aptamer clones and for kinetic analysis. The model data shows the 'Immobilisation of aptamers' onto the sensor surface, establishment of a new baseline during 'Washing' and a subsequent reduction in signal as aptamers bind to their target and are 'Displaced' from the sensor surface.

For aptamer immobilisation onto biosensor probes (Streptavidin-SA Dip & Read Biosensors, ForteBio, Pall Life Sciences, USA), 1.5 µM aptamer (or naïve library) and 1 µM immobilisation oligonucleotide were pre-hybridised in buffer BB by heating the mixture to 95° C. for 10 minutes and immediately cooling to 4° C. for 5 minutes before mixed with an equal volume of 2×B&W buffer (10 mM Tris-HCl pH 7.5, 1 mM EDTA, 2M NaCl, 0.02% Tween 20). The hybridised oligonucleotides were then immobilised onto streptavidin-coated surfaces using the biotin group on the immobilisation oligonucleotide. Streptavidin coated probes were incubated with this pre-hybridised mixture for 5 minutes. Three washing steps (30 sec, 120 sec, 30 sec) with buffer PBS6 were performed to remove loosely immobilised library material. The probes were then incubated with target solution (10 µM CPT-11, 10 µM metabolite SN-38 or 10 µM negative target Imatinib, in PBS6), for 5 min. Target binding causes a conformational change in the immobilised aptamer, resulting in aptamer displacement which is seen as decrease in signal (FIG. 3). This "dip and read" BLI assay was used to monitor aptamer-target interactions, identify the best performing aptamer clones and for comparative kinetic analysis.

Figure 4:
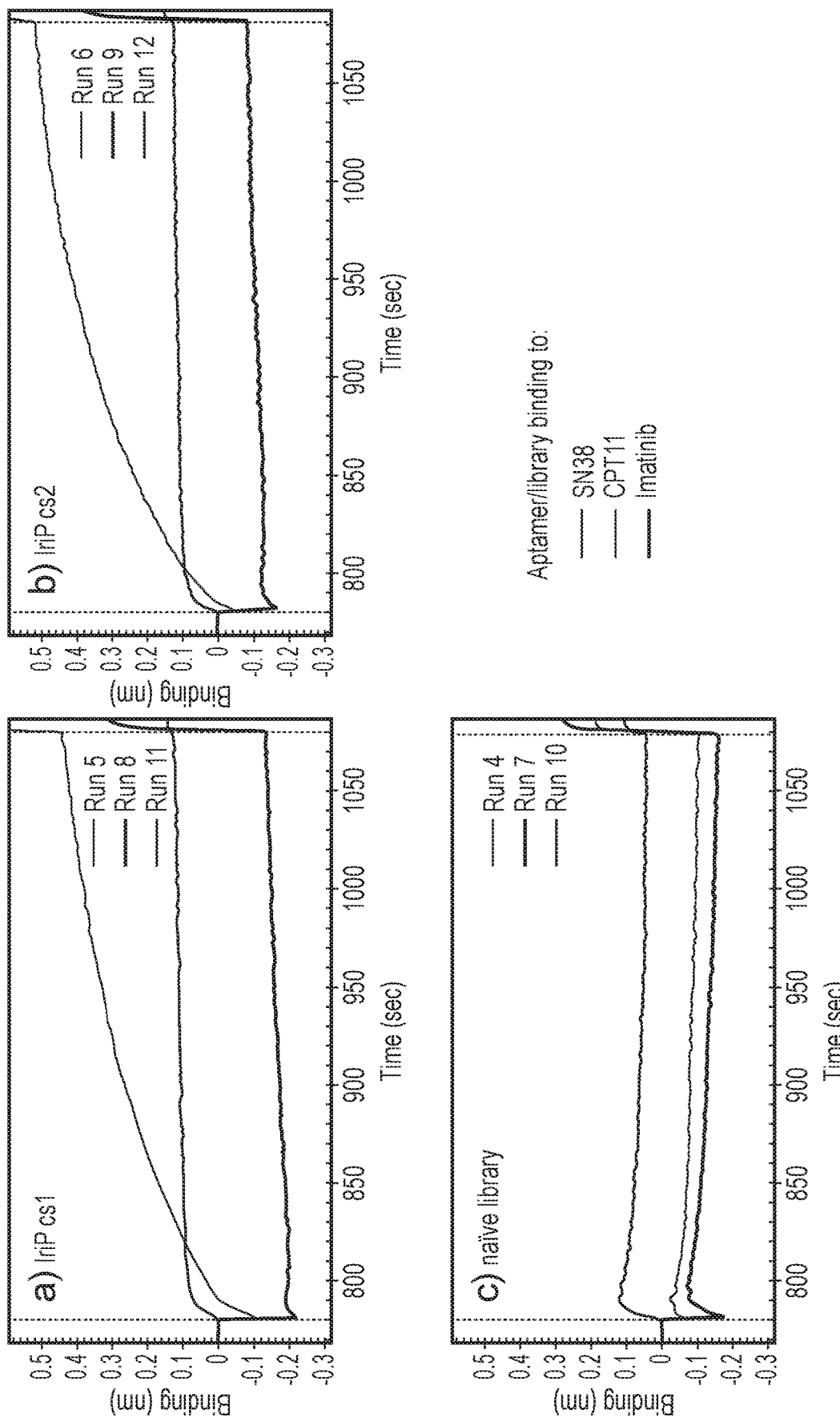
FIG. 4 shows binding of the polyclonal aptamer populations IriP cs1 and IriP cs2 monitored in a Biolayer Interferometry based displacement assay. Data shows only the 'displacement by target binding' described in FIG. 3 and has been background subtracted and 'flipped' to allow the use of the software Steady State Analysis algorithm. BLI displacement assays show a clear improvement in binding of the selected aptamer populations IriP cs1 and IriP cs2 to the selection target CPT11 (Irinotecan) in comparison to the starting library. No aptamer binding could be detected for the main metabolite of Irinotecan (SN-38) and for negative target Imatinib (structurally and functionally related).

The software of the ForteBio systems (identification) allows "flipping" the signal to enable comparative kinetic analysis. Using this approach, the BLI binding assays show a clear improvement in binding of the selected aptamer populations IriP cs1 and IriP cs2 to the selection target CPT-11 (Irinotecan) compared to naïve library (starting library of the selection process). No aptamer binding could be detected for the main metabolite of Irinotecan (SN-38) and for negative target Imatinib (structurally and functionally related) (see FIG. 4).

Cloning

After the last selection round, the recovered aptamer library was amplified by PCR, using unmodified forward and reverse primers. The purified dsDNA was cloned into the pJET1.2/blunt cloning vector, following manufacturers protocol (CloneJET PCR cloning kit, Thermo Fisher Scientic, UK) and used to transform a sequencing strain of E. coli (NEB 5-alpha E. coli C2987H cells) 96 positive transformants/clones were analysed by 'colony PCR', using plasmid-specific primer (pJET forward primer and pJET reverse primer (CloneJET PCR cloning kit, Thermo Fisher Scientic, UK). In parallel, aptamer DNA was produced from the same transformants/clones by aptamer PCR using aptamer specific FAM-labelled forward primer and $PO_4$-modified reverse primer.

Figure 5:
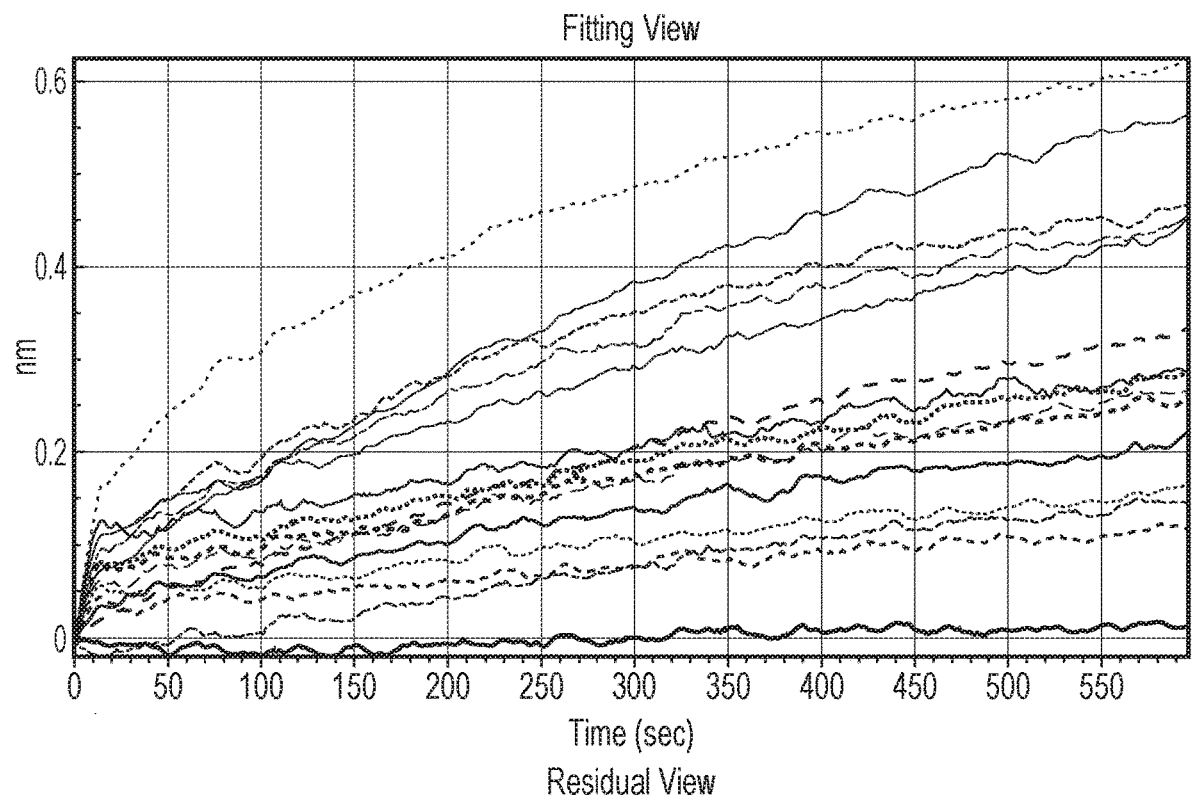
FIG. 5 shows BLI displacement assay data used for 'hit picking' of the best performing monoclonal aptamers. Data shows only the 'dissociation by target binding' described in FIG. 3, and has been background subtracted and 'flipped'. Results show identification of aptamers with improved binding to 10 µM CPT11 (Irinotecan), in comparison to other screened sequences including the naïve library.
Figure 6:
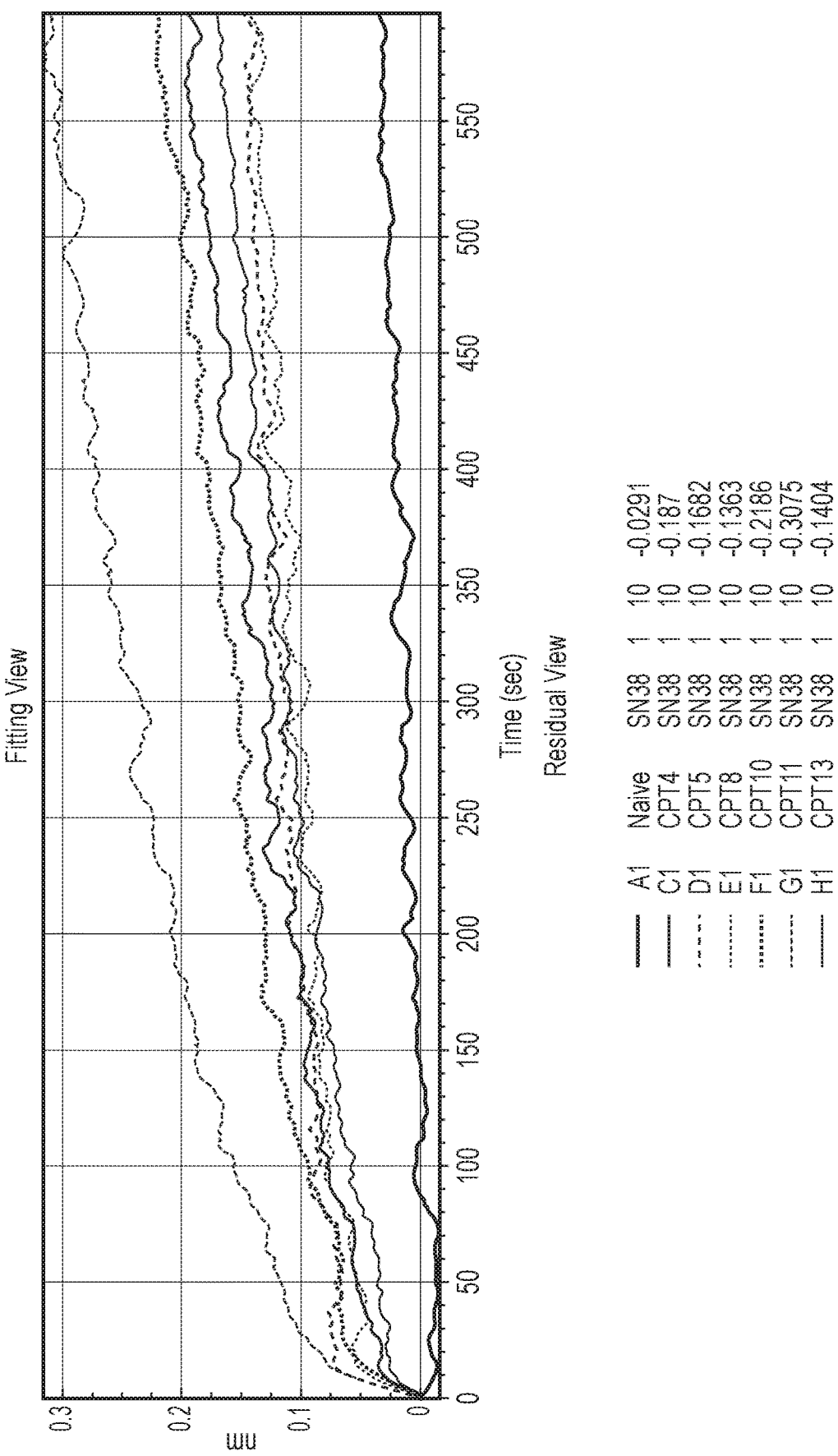
FIG. 6 shows BLI displacement assay used to monitor target binding of 6 aptamer clones to 10 µM SN38, in comparison to naïve library. (grey=naïve library). Data shows only the 'dissociation by target binding' described in FIG. 3 and has been background subtracted and 'flipped' . . . .

Identification of individual aptamers Single stranded DNA was prepared for individual aptamer clones deriving from aptamer pool IriP cs2 according to cloning protocol above. Each clone was then analysed for binding to the target CPT-11 using the BLI assay described above. The 6 best binding clones were then analysed for their binding to the metabolite SN-38. Response signals of these 6 aptamer clones binding to CPT-11 and to SN-38 were compared to find out the best binding and the most specific aptamer clone (FIGS. 5, 6 and Table 1 below).

TABLE 1

Aptamer clones binding to CPT-11 and SN-38.
Comparison of response signals.

| Aptamer clone | CPT-11 response | SN-38 response | CPT-11/SN-38 ratio |
|---|---|---|---|
| CP11 (best binding aptamer) | 0.6192 | 0.3075 | 2.014 |
| CP10 | 0.5587 | 0.2186 | 2.556 |
| CP5 | 0.4634 | 0.1682 | 2.755 |
| CP4 | 0.4481 | 0.1870 | 2.396 |
| CP13 (most specific aptamer) | 0.4416 | 0.1404 | 3.145 |
| CP8 | 0.329 | 0.1363 | 2.413 |

The DNA of both clones CP11 and CP13 were sequenced by (MRC PPU DNA Sequencing and Services, University of Dundee, UK). The obtained sequence data was analysed and aligned by using the web-based tool ClustalW provided by the EBI web server. The secondary structure analysis of the aptamers was performed using the free-energy minimization algorithm Mfold [[Zuker, M. (2003) Mfold web server for nucleic acid folding and hybridization prediction. Nucleic Acid Res. 31(13) (FIG. 1).

Determination of Apparent Aptamer Binding Affinity to Target Irinotecan (CPT-11) and Metabolite SN-38

Apparent aptamer affinity was determined using the BLI assay (displacement assay) according to the protocol described above.

The aptamers were prehybridised to the immobilisation oligonucleotide and immobilised onto a streptavidin biosensor probe as described above. Both targets, Irinotecan (CPT-11) and SN-38, were applied in a concentration series (10 µM, 5 µM, 2.5 µM, 1.25 µM, 0.625 µM, 0.3125 µM, 0 µM diluted in PBS6), respectively.

The aptamer displacement response is concentration dependent. The response can be compared using 'flipped' data and fitted using Steady State Analysis. $K_D$ values were calculated using the ForteBio software (ForteBio Data Analysis 8.0, Steady State Analysis). As the responses are not association curves, this is not a true $K_D$ measurement and is intended for comparative purposes only.

Figure 7:
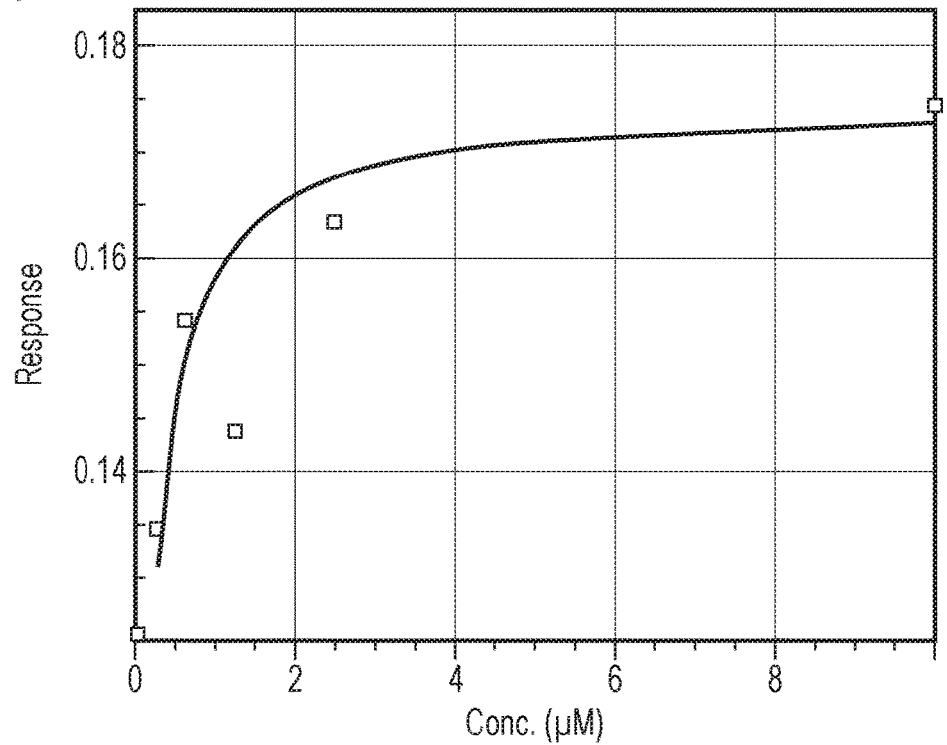
FIG. 7 shows Aptamer CP11 binding to the targets (a) Irinotecan (CPT-11) and (b) SN-38, in a concentration dependent manner as monitored by the BLI displacement assay. Apparent aptamer affinity was determined using flipped data and a Steady State Analysis. Aptamer CP11 showed target concentration dependent displacement in the presence of both Irinotecan (CPT-11) and metabolite SN-38. The apparent affinity constants ($K_D$ value) were calculated using ForteBio Data Analysis 8.0 software. The affinity of aptamer CP11 to (a) Irinotecan (in PBS6) was calculated with $1.0 \times 10^{-7}$ M±0.32 (100 nM±32). The affinity of aptamer CP11 to (b) SN-38 (in PBS6) was calculated with $8.7 \times 10^{-8}$ M±4.2 (87 nM±42). (Note: Steady State Kinetics have been fit to aptamer displacement assay data. As the responses are not association curves, this is not a true $K_D$ measurement and is intended for comparative purposes only.)
Figure 7:
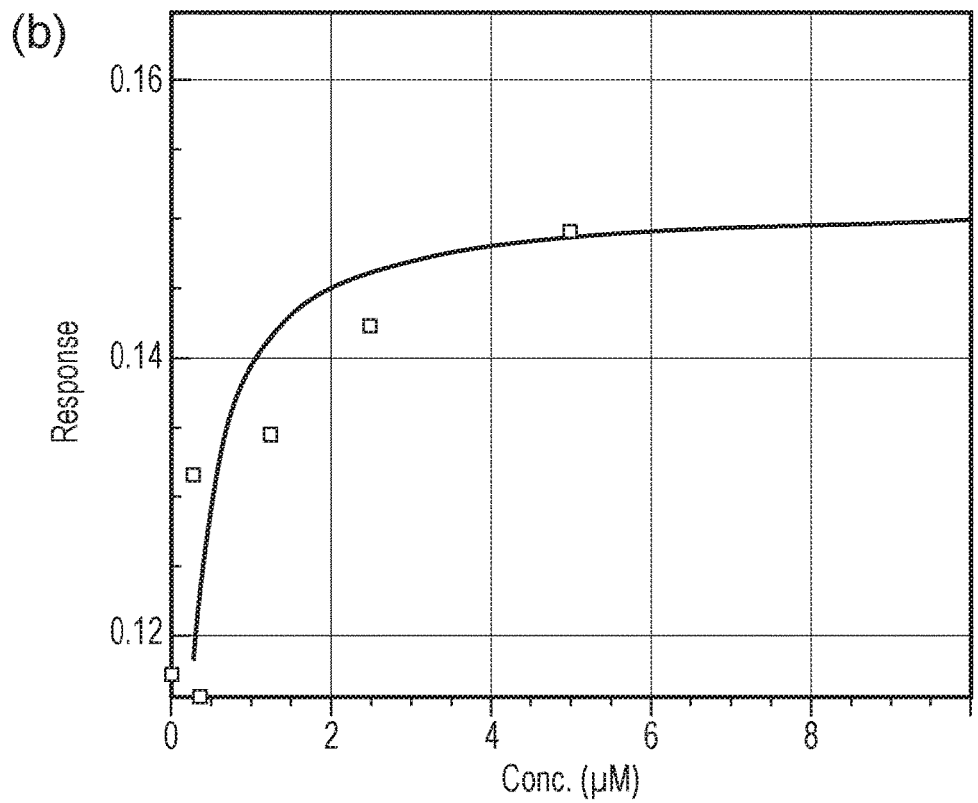

For comparative purposes, the affinity of aptamer CP11 to (a) Irinotecan (in PBS6) was calculated with $1.0 \times 10^{-7}$ M±0.32 (100 nM±32). The affinity of aptamer CP11 to (b) SN-38 (in PBS6) was calculated with $8.7 \times 10^{-8}$ M±4.2 (87 nM±42) (FIG. 7).

Figure 8:
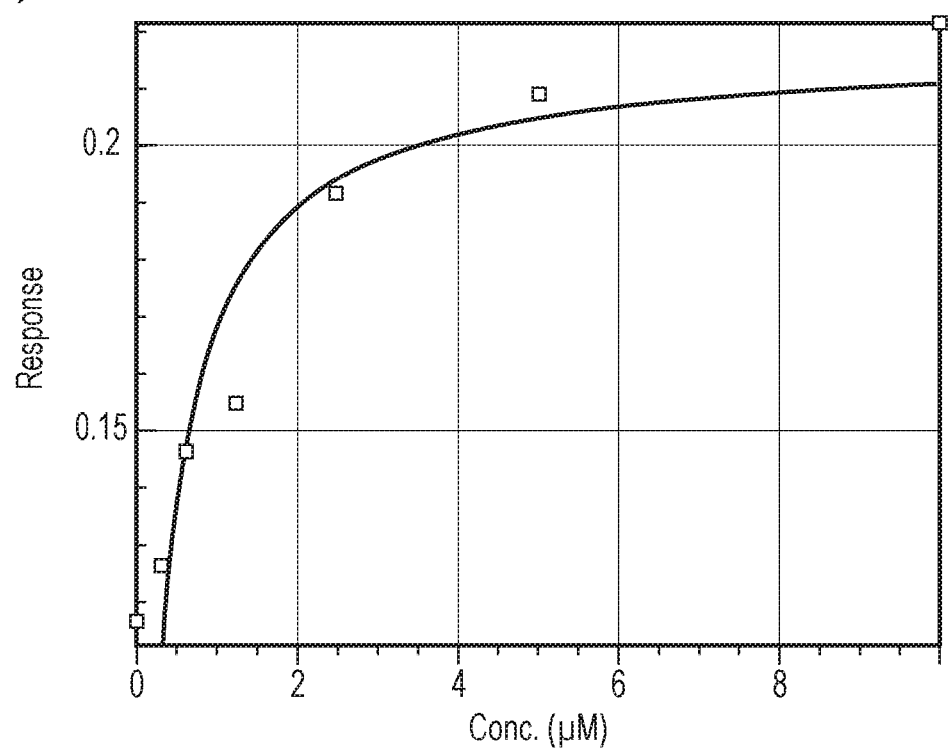
FIG. 8 shows Aptamer CP13 binding to (a) Irinotecan (CPT-11), in a concentration dependent manner, but not to (b) SN-38; as monitored by the BLI displacement assay. Apparent aptamer affinity was determined using flipped data and a Steady State Analysis. Aptamer CP13 showed target concentration dependent displacement in the presence of Irinotecan (CPT-11), but not metabolite SN-38. For comparative purposes, the apparent affinity constants ($K_D$ value) were calculated using ForteBio Data Analysis 8.0 software.
Figure 8:
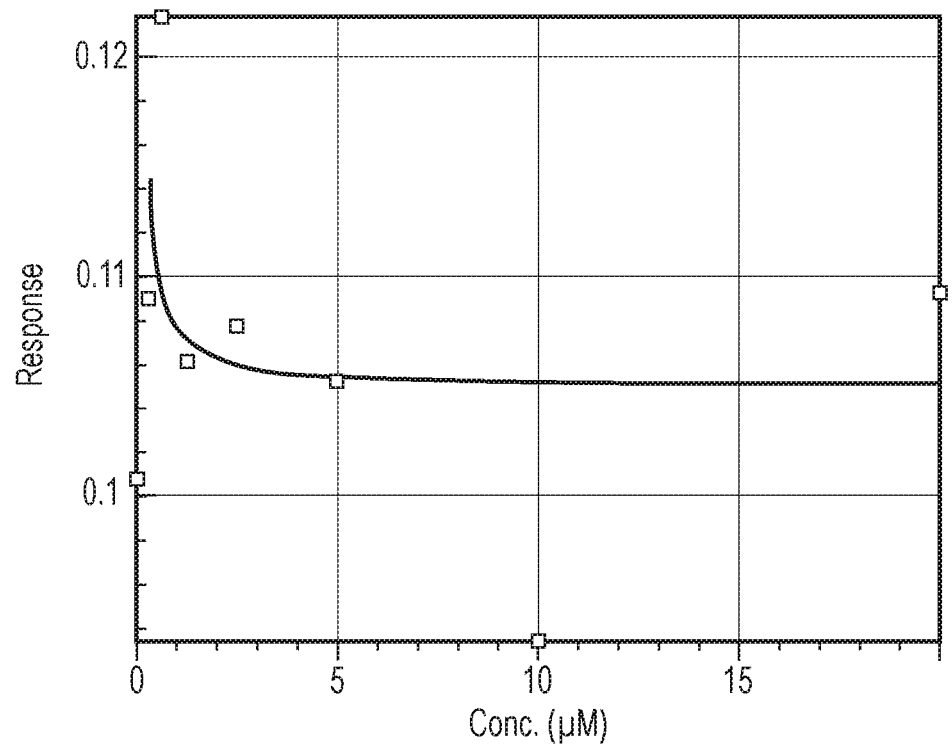

For comparative purposes, the affinity of aptamer CP13 to (a) Irinotecan (in PBS6) was calculated with $2.7 \times 10^{-7}$ M±0.34 (270 nM±34). Affinity of aptamer CP13 to (b) SN-38 (in PBS6) was not detected (FIG. 8).

Determination of Aptamer Specificity

Aptamer specificity was determined using BLI assay according to the protocol described above. Target Irinotecan (CPT-11), metabolite SN-38 and negative target Imatinib were applied at 10 µM in PBS6.

BLI tests confirmed high specificity of aptamer CP13 and moderate specificity of aptamer CP11. Aptamer CP11 showed increased binding to Irinotecan CPT-11. Lower signals were measured for metabolite SN-38. Negative target Imatinib has very low level of binding. Aptamer CP13 showed increased binding to Irinotecan (CPT-11). No binding could be detected for metabolite SN-38 and for negative target Imatinib (FIG. 9).

'ELISA-Like' Aptamer Displacement Assay (Microtiter Plate-Based Fluorescence Assay) and Evaluation of Aptamer Selectivity in Human Plasm For aptamer immobilisation onto streptavidin-coated MTPs (Pierce Streptavidin Coated, HBC, Black 96-Well Plates with SuperBlock Blocking Buffer, Thermo Scientific, USA), 0.75 µM aptamer and 0.5 µM immobilisation oligonucleotide were pre-hybridised in buffer BB by heating the mixture to 95° C. for 10 minutes and immediately cooling to 4° C. for 5 minutes before being mixed with an equal volume of 2×B&W buffer. Microtiter plate MTP 1 was incubated with this pre-hybridisation mixture for 1 h at room temperature while shaking at 1000 rpm on an MTP shaker (IKA Schüttler MTS 4, IKA Werke GmbH & Co. KG, Germany). Immobilisation efficiency was determined by comparing input and output fluorescence pre and post incubation respectively. This allows calculation of the approximate amount of aptamer loaded by fluorescence measurements. The aptamer loaded plate (MTP 1) was extensively washed with selection buffer PBS6 to remove loosely immobilised DNA before incubated for 1 h at room temperature (1000 rpm on MTP shaker) with a gradient of target Irinotecan 10 µM, 5 µM, 2.5 µM, 1.25 µM, 0.625 µM, 0 µM) prepared in buffered human serum (HUMANPL32NCU2N, BiolVT, UK) at 4 concentrations (0%, 10%, 20% & 25% v/v matrix in buffer PBS6). The fluorescent aptamer retained on the StreptaWell plate was measured (after washing to remove the released aptamers and any remaining matrix) and the amount of target bound material was calculated using measurements pre and post target incubation. The data was used to calculate the aptamer binding [%]in relation to immobilised aptamer before target incubation. Data was corrected by subtracting readings from the corresponding '0 uM target' control wells. Data was then c plotted as 'aptamer binding [%]' against 'target concentration' and at different plasma concentrations.

A clear concentration dependent binding to target Irinotecan can be observed for both aptamer CP11 and CP13, at all four plasma concentrations (FIG. 10). Tests were done at Irinotecan concentrations that reflect the therapeutic range of this therapeutic molecule. The limit of detection of Irinotecan is less than 1 µM, with clear concentration dependant responses the clinical range for this drug.

The binding specificity of aptamers CP11 and CP13 was tested using the ELISA-like assay described above. Both Irinotecan and metabolite SN38 were tested in buffered human plasma (20% plasma) (FIG. 11). Aptamer CP11 shows target-concentration dependent binding to both targets in human plasma; while aptamer CP13 shows no binding to metabolite SN-38, but strong concentration dependent binding to Irinotecan (CPT-11). Thus, aptamers CP11 and CP13 can be used in combination to determine the ratio between Irinotecan (CPT-11) and its active metabolite SN-38.

Example 2—Identification of Minimal Binding Fragment of Aptamer CP13

For identification of the minimal functional fragment of aptamer CP13, a panel of fragments (truncated versions of the parent aptamer) were produced (manufactured by IDT, Belgium). This panel was tested for binding to the target Irinotecan (10 µM in PBS6). In particular, BLI displacement binding studies were used to identify the minimal effective fragments of Aptamer CP13. A panel of truncated versions of Aptamer CP13 was tested for binding ability to target Irinotecan (10 µM in PBS6) (FIG. 12). Minimal fragment identification studies were carried out using the BLI Displacement assay (flipped data, buffer subtracted). Many of the aptamer fragments lose their ability to bind, indicating that the binding site has been removed or compromised. Other fragments show improved binding relative to the parent aptamer (CP13). The smallest and best performing aptamer fragment from this panel was CP13-F4c (FIG. 12, SEQ ID NO: 3).

The apparent binding affinity of this aptamer fragment was tested using the BLI displacement assay as described above. The aptamer CP13-F4c showed target concentration dependent aptamer displacement. The signals (R equilibrium, Req) were 'flipped' and fitted using Steady State Analysis. The Affinity constant ($K_D$ value) was calculated using ForteBio Data Analysis 8.0software. For comparative purposes, the affinity of CP13-F4c to Irinotecan (in PBS6) was calculated with $1.6 \times 10^{-7}$ M±0.4 (160 nM±40) (FIG. 13).

Target binding specificity of CP13-F4c was tested using microtiter plate-based Aptamer displacement assay ('ELISA-like' fluorescence assay). Target induced displacement was monitored using several related targets and demonstrate that the minimal functional fragment binds to its target Irinotecan (CPT-11). Irinotecan metabolites SN-38 and APC were also bound but to a lesser extent than Irinotecan. Tests were carried out in buffer PBS6 and at target concentrations that reflect the therapeutic range of these drugs (FIG. 14).

Evaluation of aptamer binding to its target (Irinotecan CPT-11) in human plasma have been verified by 'ELISA-like' Aptamer displacement assay (microtiter plate-based fluorescence assay) as described above. FIG. 15 shows target binding of minimal functional fragment CP13-F4c in human plasma. The results show that minimal fragment CP13-F4c is capable of specifically binding to target Irinotecan (CPT-11) in the presence of human plasma. Tests were carried out at target concentrations that reflect the therapeutic range of this drug.

The secondary structure analysis of CP13-F4c was performed by means of the free-energy minimization algorithm according to Zuker, 2003 using the internet tool mfold as described above (FIG. 1D).

Example 3—Identification of Minimal Binding Fragment of Aptamer CP11

For identification of the minimal functional fragment of aptamer CP11, the same protocol was followed as for Example 2. A panel of fragments (truncated versions of the parent aptamer) were produced (manufactured by IDT, Belgium). This panel was tested for binding to the target Irinotecan (10 µM in PBS6) and to metabolite SN-38 (10 µM in PBS6). In particular, BLI displacement binding studies were used to identify the minimal effective fragments of Aptamer CP11. Minimal fragment identification studies were carried out using the BLI Displacement assay (flipped data, buffer subtracted). Many of the aptamer fragments lose their ability to bind, indicating that the binding site has been removed or compromised. Other fragments show improved binding relative to the parent aptamer (CP11). The smallest and best performing aptamer fragment from this panel was CP11-F3e (SEQ ID NO: 10) (FIG. 16).

The secondary structure analysis of CP11-F3e was performed by means of the free-energy minimization algorithm according to Zuker, 2003 using the internet tool mfold as described above (FIG. 1C).

The reader's attention is directed to all papers and documents which are filed concurrently with or previous to this specification in connection with this application and which are open to public inspection with this specification, and the contents of all such papers and documents are incorporated herein by reference.

The invention claimed is:

1. An aptamer capable of specifically binding to Irinotecan, wherein the aptamer comprises a nucleic acid sequence comprising SEQ ID NO: 10.

2. The aptamer of claim 1, wherein the aptamer comprises:
   (a) a nucleic acid sequence comprising SEQ ID NO: 12;
   (b) a nucleic acid sequence comprising SEQ ID NO: 11; or
   (c) a nucleic acid sequence having at least 90% identity with either of the sequences of (a) or (b)
   wherein the aptamer is capable of specifically binding to SN-38.

3. The aptamer of claim 1, wherein the aptamer is a single stranded DNA aptamer.

4. The aptamer of claim 1, further comprising a detectable label.

5. The aptamer of claim 4, wherein the detectable label is selected from a fluorophore, a nanoparticle, a quantum dot, an enzyme, a radioactive isotope, a pre-defined sequence portion, a biotin, a desthiobiotin, a thiol group, an amine group, an azide, an aminoallyl group, a digoxigenin, an antibody, a catalyst, a colloidal metallic particle, a colloidal non-metallic particle, an organic polymer, a latex particle, a nanofiber, a nanotube, a dendrimer, a protein, and a liposome.

6. The aptamer of claim 1, wherein the aptamer is part of an apparatus comprising a support.

7. The aptamer of claim 6, wherein the support is a bead, a microtiter or other assay plate, a strip, a membrane, a film, a gel, a chip, a microparticle, a nanoparticle, a nanofiber, a nanotube, a micelle, a micropore, a nanopore or a biosensor surface.

8. The aptamer of claim 6, wherein the apparatus comprises an immobilisation oligonucleotide comprising a nucleic acid sequence which is at least partially complementary to a nucleic acid sequence of the aptamer and wherein the aptamer is capable of hybridising to the immobilisation oligonucleotide.

9. The aptamer of claim 6, wherein the aptamer is attached directly or indirectly to the support.

10. The aptamer of claim 6, wherein the apparatus is suitable for surface plasmon resonance (SPR), biolayer interferometry (BLI), lateral flow assay and/or ELONA.

11. A method of detecting the presence, absence or amount of Irinotecan and/or SN-38 in a sample, comprising:
   interacting the sample with the aptamer of claim 1; and
   detecting the presence, absence or amount of Irinotecan.

12. The method of claim 11, wherein the method comprises:
   interacting the sample with a first aptamer comprising the nucleic acid sequence of SEQ ID NO: 3;
   and detecting the amount of Irinotecan, wherein the first aptamer does not bind, or binds with only low affinity, to SN-38;
   interacting the sample with a second aptamer, wherein the second aptamer is an aptamer according to claim 1;
   and detecting the amount of Irinotecan and SN-38; and
   comparing the amounts detected in (a) and (b) to determine the presence, absence or amount of SN-38 in the sample.

13. The method of claim 11, wherein the aptamer is hybridised to an immobilisation oligonucleotide, and wherein:
   the immobilisation oligonucleotide comprises a nucleic acid sequence which is at least partially complementary to a nucleic acid sequence of the aptamer, and binding of the aptamer with any Irinotecan in the sample leads to displacement of the aptamer and immobilisation oligonucleotide allowing detection of the aptamer; and/or
   the immobilisation oligonucleotide is attached to a support.

14. The method of claim 11, wherein the presence, absence or amount of Irinotecan is detected by photonic detection, electronic detection, acoustic detection, electrochemical detection, electro-optic detection, enzymatic detection, chemical detection, biochemical detection or physical detection.

15. The method of claim 11, wherein the sample is:
   a synthetic sample, optionally wherein the sample is a pharmaceutical composition containing Irinotecan;
   a blood sample, optionally wherein the plasma trough level (Cmin) of Irinotecan is detected;
   and/or
   obtained from a subject undergoing Irinotecan therapy.

16. A method of treating or preventing cancer in a subject, comprising:
   (i) administering an initial dose of Irinotecan to the subject;
   (ii) detecting the amount of Irinotecan and/or SN-38 in a sample obtained from the subject according to the method of claim 11; and
   (iii) (a) if the level of Irinotecan and/or SN-38 is below a lower threshold level, administering an increased dose of Irinotecan to the subject; or
      (b) if the level of Irinotecan and/or SN-38 is above an upper threshold level, administering a decreased dose of Irinotecan to the subject.

17. The method of claim 16, wherein the sample is a blood sample, optionally wherein the plasma trough level (Cmin) of Irinotecan in the blood sample is detected.

18. The method of claim 17, wherein:
   the lower threshold level of Irinotecan is about 10 ng/ml or less and/or the upper threshold level of Irinotecan is about 2,000 ng/ml or more; or
   the lower threshold level of SN-38 is about 0.5 ng/ml or less and/or the upper threshold level of SN-38 is about 25 ng/ml or more.

19. The method of claim 16, wherein the level of Irinotecan and/or SN-38 is detected about 3, 6 and/or 12 months after administering the initial dose of Irinotecan to the subject.

20. The method of claim 12, wherein the first aptamer comprises:
   (i) a nucleic acid sequence comprising any one of SEQ ID NOs: 4 to 7; or
   (ii) a nucleic acid sequence having at least 90% identity with any sequence of (i).

21. The method of claim 12, wherein the second aptamer comprises:
   (i) a nucleic acid sequence comprising SEQ ID NO: 12;
   (ii) a nucleic acid sequence comprising SEQ ID NO: 11; or
   (iii) a nucleic acid sequence having at least 90% identity with either of the sequences of (i) or (ii).

* * * * *